(12) United States Patent
Xu

(10) Patent No.: US 10,885,397 B2
(45) Date of Patent: *Jan. 5, 2021

(54) COMPUTER-EXECUTED METHOD AND APPARATUS FOR ASSESSING VEHICLE DAMAGE

(71) Applicant: Advanced New Technologies Co., Ltd., Grand Cayman (KY)

(72) Inventor: Juan Xu, Beijing (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/871,446

(22) Filed: May 11, 2020

(65) Prior Publication Data

US 2020/0272866 A1    Aug. 27, 2020

Related U.S. Application Data

(63) Continuation of application No. 16/723,541, filed on Dec. 20, 2019, now Pat. No. 10,699,168.

(30) Foreign Application Priority Data

Dec. 29, 2018   (CN) .......................... 2018 1 1631844

(51) Int. Cl.
*G06K 9/00*          (2006.01)
*G06K 9/62*          (2006.01)
(Continued)

(52) U.S. Cl.
CPC ......... *G06K 9/6292* (2013.01); *G06K 9/6228* (2013.01); *G06K 9/6256* (2013.01);
(Continued)

(58) Field of Classification Search
CPC .. G06K 9/6292; G06K 9/6256; G06K 9/6262; G06K 2209/23; G06N 20/00; G06Q 40/08

See application file for complete search history.

(56) References Cited

U.S. PATENT DOCUMENTS

| | | | | |
|---|---|---|---|---|
| 7,809,587 B2 * | 10/2010 | Dorai | .................... | G06Q 40/08 703/6 |
| 9,886,771 B1 * | 2/2018 | Chen | .................... | G06T 7/0032 |
| 2017/0293894 A1 * | 10/2017 | Taliwal | .................... | G06T 7/11 |

FOREIGN PATENT DOCUMENTS

| | | |
|---|---|---|
| CN | 108229523 A | 6/2018 |
| CN | 108229675 A | 6/2018 |
| WO | WO 2018/055340 A1 | 3/2018 |

OTHER PUBLICATIONS

International Search Report and Written Opinion dated Feb. 26, 2020, in counterpart International Application No. PCT/US2019/067765.

* cited by examiner

*Primary Examiner* — Ping Y Hsieh
(74) *Attorney, Agent, or Firm* — Finnegan, Henderson, Farabow, Garrett & Dunner, L.L.P.

(57) ABSTRACT

A method for assessing vehicle damage, includes: acquiring a to-be-identified vehicle damage image; acquiring damage object detection information in the image; acquiring vehicle component information for the vehicle damage image, the vehicle component information including a detected first component; generating a first comprehensive feature for the first component; determining a plurality of candidate prediction results for the first component, each of the candidate prediction results comprising a candidate component category and a candidate damage category; obtain a first prediction result including, for each of the candidate pre- (Continued)

diction results, a probability that the candidate damage category thereof is correct; obtaining a second prediction result including, for each of the candidate prediction results, a probability that the candidate component category thereof is correct; and determining the component category of the first component and the corresponding damage category thereof at least based on the first prediction result and the second prediction result.

20 Claims, 17 Drawing Sheets

(51) Int. Cl.
*G06N 20/00* (2019.01)
*G06Q 40/08* (2012.01)
(52) U.S. Cl.
CPC ........... *G06K 9/6262* (2013.01); *G06N 20/00* (2019.01); *G06Q 40/08* (2013.01); *G06K 2209/23* (2013.01)

800

```
┌─────────────────────────────────────────────┐
│ Acquiring, for each candidate prediction result, a │
│ first probability from the first prediction result and │
│ corresponding to the candidate prediction result, and │ ─ 81
│ a second probability from the second prediction result │
│ and corresponding to the candidate prediction result │
└─────────────────────────────────────────────┘
                      │
                      ▼
┌─────────────────────────────────────────────┐
│ Determining a comprehensive correctness probability │
│ for each candidate prediction result based on the first │ ─ 82
│ probability and the second probability │
└─────────────────────────────────────────────┘
                      │
                      ▼
┌─────────────────────────────────────────────┐
│ Selecting at least one prediction result from the │
│ plurality of candidate prediction results based on the │ ─ 83
│ comprehensive correctness probability │
└─────────────────────────────────────────────┘
                      │
                      ▼
┌─────────────────────────────────────────────┐
│ Determining the component category of the first │
│ component and the corresponding damage category │
│ based on the candidate component categories and the │ ─ 84
│ candidate damage categories included in the selected at │
│ least one prediction result │
└─────────────────────────────────────────────┘
```

COMPUTER-EXECUTED METHOD AND APPARATUS FOR ASSESSING VEHICLE DAMAGE

CROSS-REFERENCE TO RELATED APPLICATIONS

This application is a continuation application of U.S. application Ser. No. 16/723,541, filed on Dec. 20, 2019, which is based upon and claims priority to Chinese Patent Application No. 201811631844.0, filed on Dec. 29, 2018, the entire contents of all of which are incorporated herein by reference.

TECHNICAL FIELD

The present specification relates to the field of machine learning, and particularly, to a method and apparatus for smart vehicle damage assessment using machine learning.

TECHNICAL BACKGROUND

In a conventional vehicle insurance claim settlement scenario, insurance companies need to dispatch professional survey and damage assessment personnel to an accident site to conduct an on-site survey and damage assessment, provide a vehicle repair scheme and a compensation amount, take on-site photos, and file the damage assessment photos for a background verifier to verify the damage and the compensation amount. As the survey and damage assessment need to be conducted manually, the insurance companies need a large investment for labor costs and specialized knowledge training costs. In terms of the experience of ordinary users, as the users need to wait for a manual surveyor to take photos on site, a damage assessor to assess damage on the repair site, and a damage verifier to conduct a background damage check during the claim settlement process, the claim settlement cycle takes up to 1-3 days, the users' waiting time is relatively long, and the experience is poor.

For the industry pain point of huge labor costs mentioned in the background, some people started to conceive of applying artificial intelligence and machine learning to vehicle damage assessment scenarios, hoping that vehicle damage situations reflected in photos can be automatically identified based on on-site damage photos photographed by general users and using computer vision image identification technologies in the artificial intelligence field, and moreover, repair schemes can be automatically provided. In this way, there is no need to conduct manual surveys, damage assessments, and damage verification, greatly reducing insurance company costs and improving the vehicle insurance claim settlement experience of ordinary users.

However, the accuracy of the current smart damage assessment schemes in determining vehicle damage needs to be further improved. Therefore, it is desirable to have an improved scheme, which can further optimize vehicle damage detection results and improve identification accuracy.

SUMMARY

Embodiments of the present specification provide a computer-executed method for assessing vehicle damage, to efficiently determine a damaged vehicle component category and a damage category thereof by fusing a vehicle component feature and a damage feature and performing comprehensive determination using a prediction model.

According to a first aspect, a computer-executed method for assessing vehicle damage includes:

acquiring a to-be-identified vehicle damage image;

acquiring damage object detection information using a pre-trained damage detection model, the damage object detection information including information of a plurality of damage detection frames framing a plurality of damage objects in the vehicle damage image;

acquiring vehicle component information for the vehicle damage image using a pre-trained component model, the vehicle component information including component object detection information and component segmentation information, the component object detection information including a detected first component;

generating a first comprehensive feature for the first component based on the damage object detection information and the vehicle component information, the first comprehensive feature including a component feature and a fused damage feature of the first component, the fused damage feature being obtained by fusing damage features of at least one damage detection frame belonging to the first component among the plurality of damage detection frames;

determining a plurality of candidate prediction results for the first component, each of the candidate prediction results including a candidate component category and a candidate damage category;

inputting the first comprehensive feature and the plurality of candidate prediction results into a pre-trained first condition prediction model to obtain a first prediction result, the first prediction result including, for each of the candidate prediction results, a probability that the candidate damage category thereof is correct;

inputting the first comprehensive feature and the plurality of candidate prediction results into a pre-trained second condition prediction model to obtain a second prediction result, the second prediction result including, for each of the candidate prediction results, a probability that the candidate component category thereof is correct; and determining the component category of the first component and the corresponding damage category thereof at least based on the first prediction result and the second prediction result.

According to a second aspect, a computer-executed method for assessing vehicle damage includes:

acquiring a first to-be-identified vehicle damage image and a second to-be-identified vehicle damage image, the first vehicle damage image and the second vehicle damage image belonging to a same damage assessment case;

acquiring first damage object detection information for the first vehicle damage image and second damage object detection information for the second vehicle damage image using a pre-trained damage detection model, the first damage object detection information including information of a plurality of first damage detection frames framing a plurality of damage objects in the first vehicle damage image, the second damage object detection information including information of a plurality of second damage detection frames framing a plurality of damage objects in the second vehicle damage image;

acquiring first vehicle component information for the first vehicle damage image and second vehicle component information for the second vehicle damage image using a pre-trained component model, the first vehicle component information including first component object detection information and first component segmentation information, the second vehicle component information including second component object detection information and second component segmentation information;

determining a common first component from the first component object detection information and the second component object detection information based on an association between the first vehicle damage image and the second vehicle damage image;

generating a first comprehensive feature for the first component based on the first damage object detection information, the second damage object detection information, the first vehicle component information, and the second vehicle component information, the first comprehensive feature including a fused component feature and a fused damage feature of the first component, wherein the fused component feature is obtained by fusing a first component feature and a second component feature, the first component feature being generated based on the first vehicle damage image, and the second component feature being generated based on the second vehicle damage image, and the fused damage feature is obtained by fusing a first damage feature and a second damage feature, the first damage feature being generated based on damage features of at least one first damage detection frame belonging to the first component in the first vehicle damage image, and the second damage feature being generated based on damage features of at least one second damage detection frame belonging to the first component in the second vehicle damage image;

determining a plurality of candidate prediction results for the first component, each of the candidate prediction results including a candidate component category and a candidate damage category;

inputting the first comprehensive feature and the plurality of candidate prediction results into a pre-trained first condition prediction model to obtain a first prediction result, the first prediction result including, for each of the candidate prediction results, a probability that the candidate damage category thereof is correct;

inputting the first comprehensive feature and the plurality of candidate prediction results into a pre-trained second condition prediction model to obtain a second prediction result, the second prediction result including, for each of the candidate prediction results, a probability that the candidate component category thereof is correct; and determining the component category of the first component and the corresponding damage category thereof at least based on the first prediction result and the second prediction result.

According to a third aspect, an apparatus for assessing vehicle damage includes a memory storing computer-executable instructions, and a processor configured to, when executing the computer-executable instructions, perform:

acquiring a to-be-identified vehicle damage image;

acquiring damage object detection information using a pre-trained damage detection model, the damage object detection information including information of a plurality of damage detection frames framing a plurality of damage objects in the vehicle damage image;

acquiring vehicle component information for the vehicle damage image using a pre-trained component model, the vehicle component information including component object detection information and component segmentation information, the component object detection information including a detected first component;

generating a first comprehensive feature for the first component based on the damage object detection information and the vehicle component information, the first comprehensive feature including a component feature and a fused damage feature of the first component, the fused damage feature being obtained by fusing damage features of at least one damage detection frame belonging to the first component among the plurality of damage detection frames;

determining a plurality of candidate prediction results for the first component, each of the candidate prediction results including a candidate component category and a candidate damage category;

inputting the first comprehensive feature and the plurality of candidate prediction results into a pre-trained first condition prediction model to obtain a first prediction result, the first prediction result including, for each of the candidate prediction results, a probability that the candidate damage category thereof is correct;

inputting the first comprehensive feature and the plurality of candidate prediction results into a pre-trained second condition prediction model to obtain a second prediction result, the second prediction result including, for each of the candidate prediction results, a probability that the candidate component category thereof is correct; and determining the component category of the first component and the corresponding damage category thereof at least based on the first prediction result and the second prediction result.

According to a fourth aspect, an apparatus for assessing vehicle damage includes a memory storing computer-executable instructions, and a processor configured to, when executing the computer-executable instructions, perform:

acquiring a first to-be-identified vehicle damage image and a second to-be-identified vehicle damage image, the first vehicle damage image and the second vehicle damage image belonging to the same damage assessment case;

acquiring first damage object detection information for the first vehicle damage image and second damage object detection information for the second vehicle damage image using a pre-trained damage detection model, the first damage object detection information including information of a plurality of first damage detection frames framing a plurality of damage objects in the first vehicle damage image, and the second damage object detection information including information of a plurality of second damage detection frames framing a plurality of damage objects in the second vehicle damage image;

acquiring first vehicle component information for the first vehicle damage image and second vehicle component information for the second vehicle damage image using a pre-trained component model, the first vehicle component information including first component object detection information and first component segmentation information, and the second vehicle component information including second component object detection information and second component segmentation information;

determining a common first component from the first component object detection information and the second component object detection information based on an association between the first vehicle damage image and the second vehicle damage image;

generating a first comprehensive feature for the first component based on the first damage object detection information, the second damage object detection information, the first vehicle component information, and the second vehicle component information, the first comprehensive feature including a fused component feature and a fused damage feature of the first component, where the fused component feature is obtained by fusing a first component feature and a second component feature, the first component feature being generated based on the first vehicle damage image, and the second component feature being generated based on the second vehicle damage image, and the fused damage feature is obtained by fusing a first damage feature and a second damage feature, the first damage feature being generated based on damage features of at least one first damage detection frame belonging to the first component in the first vehicle damage image, and the second damage feature being generated based on damage features of at least one second damage detection frame belonging to the first component in the second vehicle damage image;

determining a plurality of candidate prediction results for the first component, each of the candidate prediction results including a candidate component category and a candidate damage category;

inputting the first comprehensive feature and the plurality of candidate prediction results into a pre-trained first condition prediction model to obtain a first prediction result, the first prediction result including, for each of the candidate prediction results, a probability that the candidate damage category thereof is correct;

inputting the first comprehensive feature and the plurality of candidate prediction results into a pre-trained second condition prediction model to obtain a second prediction result, the second prediction result including, for each of the candidate prediction results, a probability that the candidate component category thereof is correct; and determining the component category of the first component and the corresponding damage category thereof at least based on the first prediction result and the second prediction result.

According to a fifth aspect, a computer-readable storage medium is provided, storing a computer program thereon, where the computer program, when executed in a computer, causes the computer to execute the method of the first aspect and the second aspect.

According to the method and apparatus provided in the embodiments of the present specification, in a process of smart damage assessment, a component feature and a damage feature are fused to obtain a component-level damage feature after damage and a component are identified using a damage detection model and a component model, respectively. Then, a component category and a damage category are determined using a plurality of prediction models, including at least two condition prediction models, based on the component-level damage feature, thereby determining a vehicle damage situation, and achieving smart damage assessment.

BRIEF DESCRIPTION OF THE DRAWINGS

The accompanying drawings, which are incorporated in and constitute a part of this specification, illustrate embodiments and, together with the description, serve to explain the principles of the specification.

FIG. 8 shows a step-by-step flowchart of determining a component category and a damage category based on a first prediction result and a second prediction result in an embodiment;

DETAILED DESCRIPTION

The solutions provided in the present specification will be described below in conjunction with the accompanying drawings.

Smart vehicle damage assessment mainly relates to automatically identifying a vehicle damage situation reflected in photos from on-site damage photos photographed by a general user. In order to identify the vehicle damage situation in a vehicle image, a method generally used in the industry is to obtain a similar image by comparison with a massive historical database to determine a damaged component in the image and the degree of damage. However, the accuracy in identifying damage in such a way is not ideal.

Based on the concepts and implementation framework of the present specification, and considering that the vehicle damage situation generally needs to include vehicle component information and damage degree information, i.e., which component is damaged, and what type/degree of damage is suffered by the component, in multiple embodiments, a vehicle component and vehicle damage are identified separately, and then the results are fused.

Figure 1:
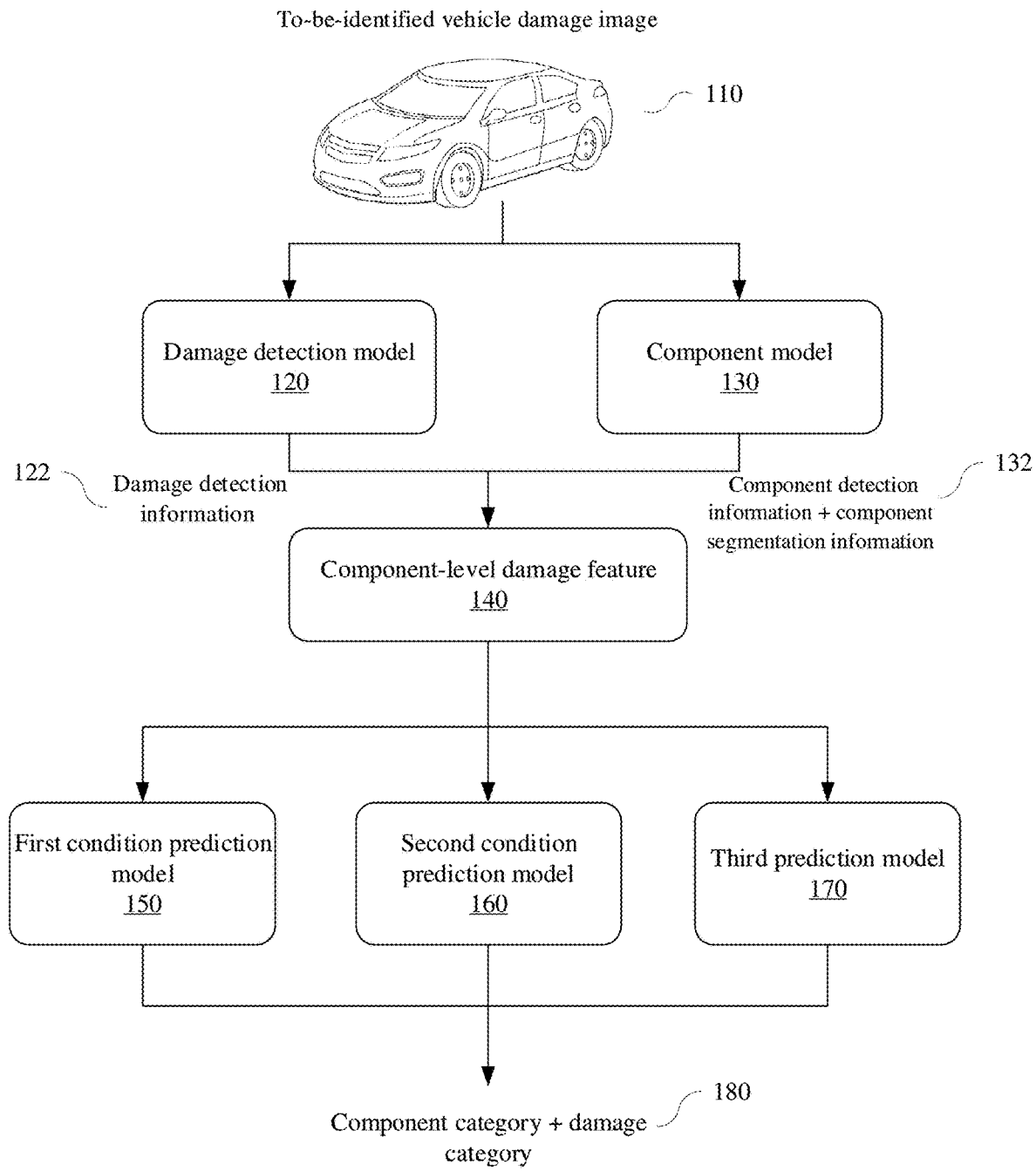
FIG. 1 shows a schematic diagram of an implementation scenario of an embodiment disclosed in the present specification.

FIG. 1 is a schematic diagram of an implementation scenario of the methods provided in the present specification, according to an embodiment. As shown in FIG. 1, after acquiring a vehicle damage image 110, the vehicle damage image 110 is separately input into a damage detection model 120 and a component model 130, thereby obtaining damage detection information 122 and component information 132. The damage detection information 122 includes an identified damage detection frame, and the component information 132 includes not only an identified component detection frame, but also component contour segmentation information. A component-level damage feature 140 can be generated by combining the damage detection information 122 and the component information 132. The component-level damage feature 140 includes a component feature of a component, and a fused damage feature of all damage detection frames belonging to the component. Thus, the component-level damage feature 140 can be used for characterizing overall features of the component and damage.

Then, the component-level damage feature 140 is separately input into a plurality of prediction models, to separately determine a component category and a damage category. For example, the plurality of prediction models may include a first condition prediction model 150 and a second condition prediction model 160 for use as condition prediction models. The first condition prediction model 150 is trained based on training data with manual damage annotations, and is focused on predicting the damage category. For example, when inputting the component-level damage feature 140 and a two-element set of a candidate component category and a candidate damage category into the first condition prediction model 150, the model 150 can output a probability that the damage category is correct under an assumption that the component category is correct. The second condition prediction model 160 is trained based on training data with manual component annotations, and is focused on predicting the component category. For example, when inputting the component-level damage feature 140 and a two-element set of a candidate component category and a candidate damage category into the second condition prediction model 160, the model 160 can output a probability that the component category is correct under an assumption that the damage category is correct. Alternatively and/or additionally, a third prediction model 170 may be further employed to give a probability that the component category and the damage category in the two-element set are both correct.

Thus, prediction results from the plurality of prediction models can be combined to determine prediction results 180 of the component category and the damage category for the above-mentioned component-level damage feature. Thus, vehicle damage situation information is obtained. A specific implementation process of smart damage assessment is described below.

Figure 2:
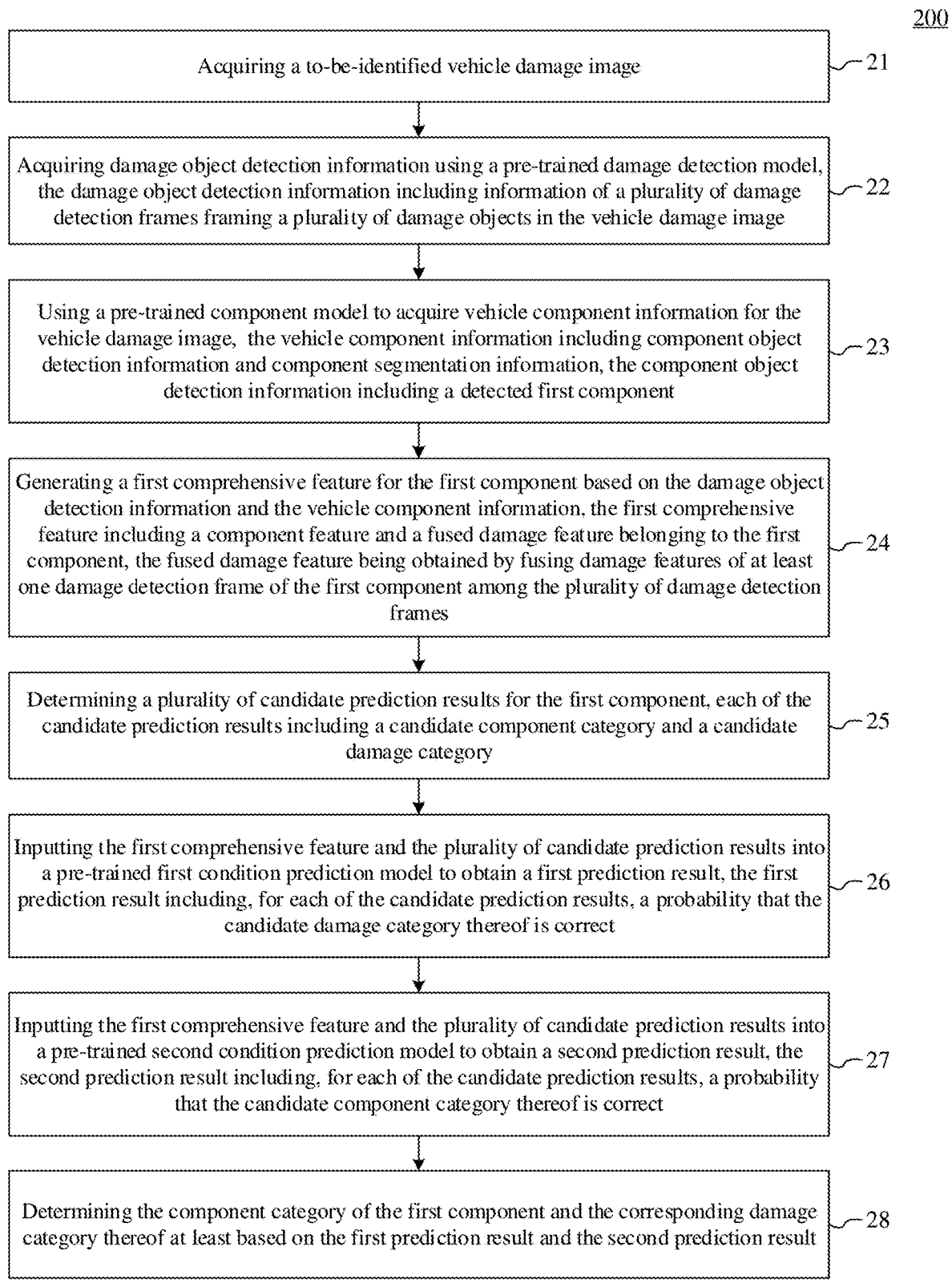
FIG. 2 shows a flowchart of a method for assessing vehicle damage according to an embodiment.

FIG. 2 shows a flowchart of a method 200 for assessing vehicle damage according to an embodiment. The method can be executed by any apparatus, device, platform, and device cluster having computing and processing capabilities. As shown in FIG. 2, the method at least includes the following steps.

In step 21, a to-be-identified vehicle damage image is acquired.

In step 22, damage object detection information is acquired using a pre-trained damage detection model. The damage object detection information includes information of a plurality of damage detection frames framing a plurality of damage objects in the vehicle damage image.

In step 23, using a pre-trained component model, vehicle component information for the vehicle damage image is acquired. The vehicle component information includes component object detection information and component segmentation information. The component object detection information includes a detected first component.

In step 24, a first comprehensive feature for the first component is generated based on the damage object detection information and the vehicle component information. The first comprehensive feature includes a component feature and a fused damage feature belonging to the first component. The fused damage feature is obtained by fusing damage features of at least one damage detection frame of the first component among the plurality of damage detection frames.

In step 25, a plurality of candidate prediction results for the first component are determined. Each of the candidate prediction results includes a candidate component category and a candidate damage category.

In step 26, the first comprehensive feature and the plurality of candidate prediction results are input into a pre-trained first condition prediction model to obtain a first prediction result. The first prediction result includes, for each of the candidate prediction results, a probability that the candidate damage category thereof is correct.

In step 27, the first comprehensive feature and the plurality of candidate prediction results are input into a pre-trained second condition prediction model to obtain a second prediction result. The second prediction result includes, for each of the candidate prediction results, a probability that the candidate component category thereof is correct.

In step 28, the component category of the first component and the corresponding damage category thereof are determined at least based on the first prediction result and the second prediction result.

Execution approaches for the above steps are described below.

First, in step 21, a to-be-identified vehicle damage image is acquired. The image may be an on-site vehicle damage photo photographed by a general user and is an image to be processed by damage identification.

Figure 3:
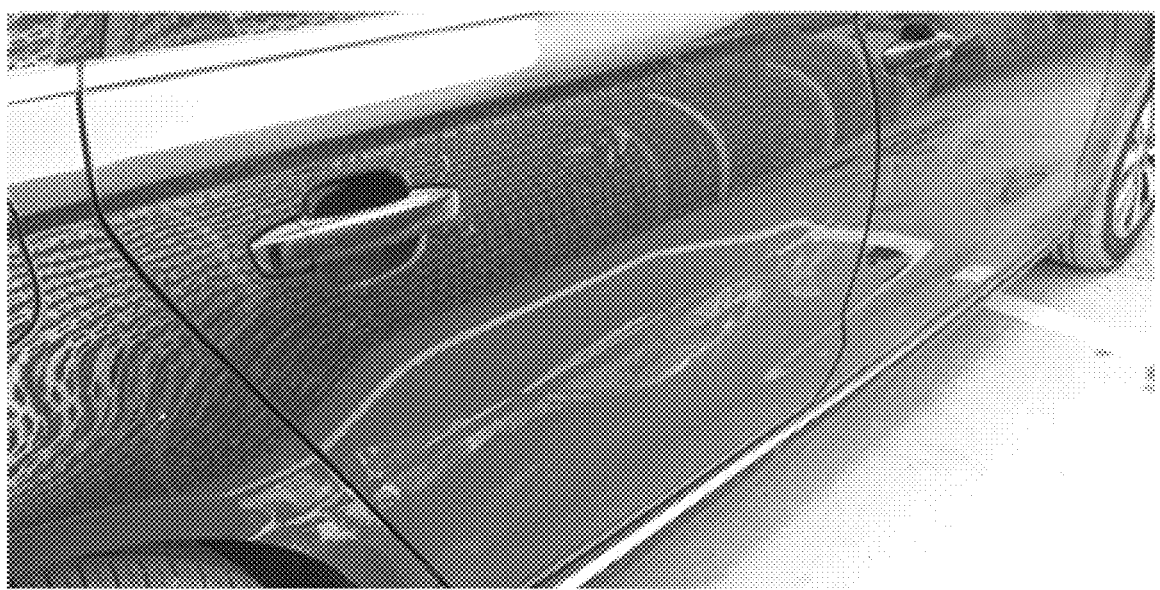
FIG. 3 shows an example of a vehicle damage image.

FIG. 3 shows an example of a vehicle damage image. The image is an unprocessed on-site photo photographed by the general user.

Next, in step 22, damage object detection information is acquired using a pre-trained damage detection model.

The damage detection model is a specific application of a typical target detection model in the computer vision field. As is well known to those skilled in the art, a target detection model is configured to identify specific target objects from an image and classify the target objects. Generally, a target detection model is obtained by training based on annotated image samples, and after completing the training, a specific target object in an unknown image can be detected and identified. For example, a target detection model will output a target detection frame and a predicted category, where the target detection frame may be a smallest rectangular frame framing the target object, and the predicted category is a category predicted for the target object framed by the target detection frame.

A damage detection model may be trained by annotating vehicle damage as the target object. After completing the training, the damage detection model can detect and identify a damage object in an unknown vehicle damage image. For example, the damage object detection information output from the damage detection model includes damage detection frames framing each damage object in the vehicle damage image, and a predicted damage category for each damage detection frame.

Figure 4A:
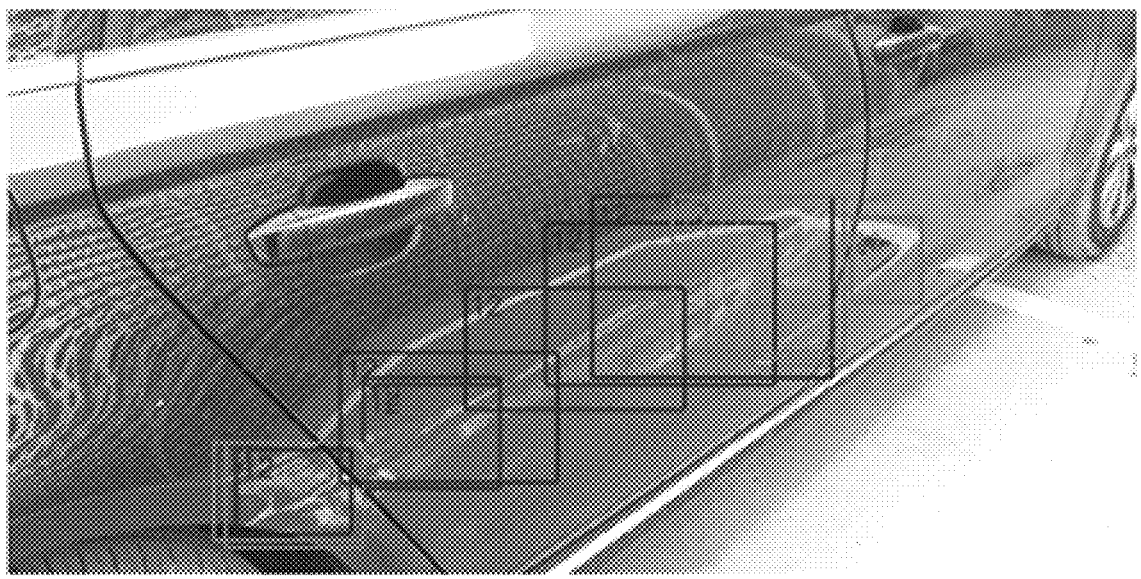
FIG. 4A shows an example of damage object detection information obtained for the vehicle damage image shown in FIG. 3.

FIG. 4A shows an example of damage object detection information obtained for the vehicle damage image shown in FIG. 3. It can be seen that on the basis of FIG. 3, FIG. 4A includes a series of rectangular frames, i.e., the damage detection frames output from a damage detection model. Each damage detection frame frames an area of damage. The damage detection model further outputs a predicted damage category corresponding to each damage detection frame. For example, a numeral at the top left corner of each rectangular frame denotes a damage category. For example, in FIG. 4A, the numeral 12 denotes a scratch damage category. There may also be other numerals denoting other damage categories. For example, the numeral 10 denotes deformation, the numeral 11 denotes tearing, and the numeral 13 denotes shattering (of a glass article), and the like.

In the present art, various kinds of target detection models have been presented based on various network structures and various detection algorithms. For example, a one-stage detection model can directly determine the category probability and position coordinates of a target object from an image, i.e., directly identifying the target object. Typical examples of one-stage detection models include SSD models, Yolo models, and the like. A two-stage detection model first generates a candidate region, also called a region of interest (ROI), in the image, and then performs target identification and frame regression in the candidate region. Typical examples of two-stage detection models include R-CNN models, Fast R-CNN models, Faster R-CNN models, and the like. Other target detection models have also been presented.

The damage detection model in step 22 can be implemented using any of the aforementioned target detection algorithms.

In an embodiment, in step 22, the to-be-identified vehicle damage image is input into a plurality of damage detection models. The plurality of damage detection models use different target detection algorithms for damage detection, and output detection results respectively, i.e., output identified damage detection frames and predicted damage categories respectively. For example, in a specific example, 3 damage detection models may be employed. The 3 damage detection models detect damage objects using an SSD model algorithm, a Yolo model algorithm, and a Fast R-CNN model algorithm, respectively. Accordingly, the finally obtained damage detection information includes information from damage detection frames of the 3 damage detection models. For example, a series of damage detection frames shown in FIG. 4A may be detection results from a plurality of damage detection models.

In step 23, vehicle component information for the vehicle damage image is acquired using a pre-trained component model. The vehicle component information may include component object detection information and component segmentation information or contour information, with the component as the target detection object.

In an embodiment, the component object detection information for the vehicle damage image can be acquired using a pre-trained component detection model. The component object detection information includes component detection frames each framing a corresponding component and a predicted component category corresponding to each component detection frame.

Similar to the damage detection model, the component detection model is also a specific application of a target detection model, i.e., a detection model with vehicle components as the target object. A component detection model can be trained by annotating vehicle components as the target object. After completing the training, the component detection model can detect and identify a component in an unknown vehicle damage image. Specifically, the component object detection information output from the component detection model includes component detection frames framing each component in the vehicle damage image, and a predicted component category for each component detection frame.

Figure 4B:
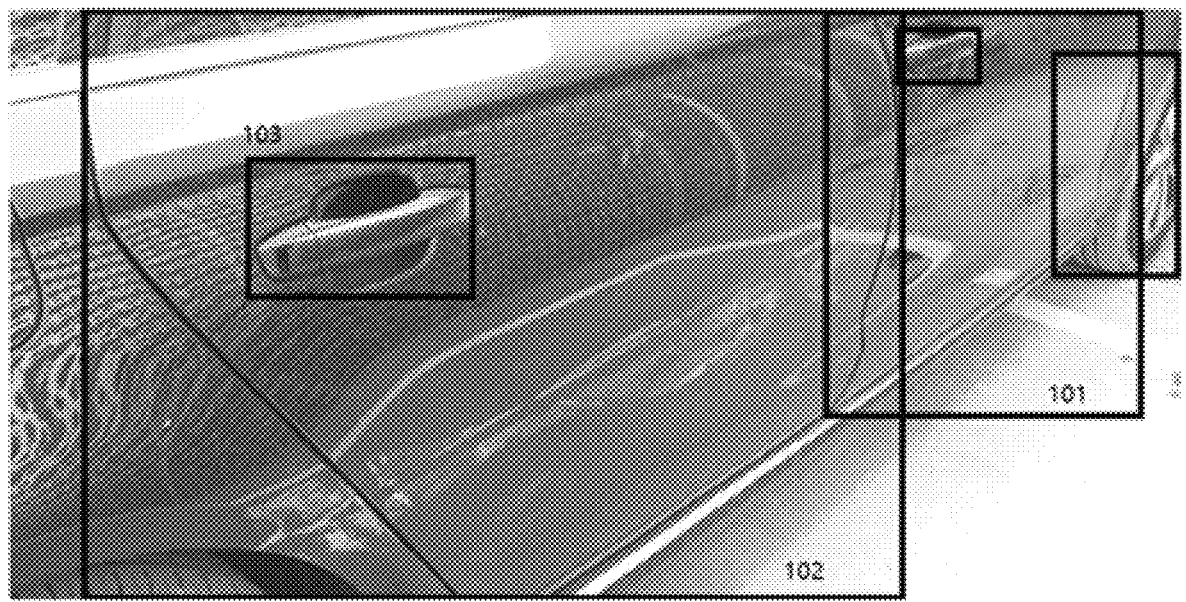
FIG. 4B shows an example of component object detection information obtained for the vehicle damage image shown in FIG. 3.

FIG. 4B shows an example of component object detection information obtained for the vehicle damage image shown in FIG. 3. It can be seen that on the basis of FIG. 3, FIG. 4B includes some component detection frames. Each component detection frame frames a component. The component detection model can further output a predicted damage category corresponding to each component detection frame. For example, a numeral at the top left corner of each rectangular frame denotes a component category. For example, in FIG. 4B, the numeral 101 denotes a right front door, the numeral 102 denotes a right rear door, the numeral 103 denotes a door handle, and the like.

The component detection model may also be implemented using any target detection algorithm, e.g., an algorithm in an SSD model, a Yolo model, a R-CNN model, a Fast R-CNN model, or a Faster R-CNN model.

In an embodiment, in step 23, a segmentation result for all components in the vehicle damage image is acquired using a component segmentation model.

As is well known to those skilled in the art, an image segmentation model is configured to segment or divide an image into regions that belong, or do not belong, to a specific target object, and its output can be expressed as a mask covering a specific target object region. A component segmentation model is a specific application of an image segmentation model, and is configured to divide a vehicle image into regions that belong, or do not belong to, a specific component. Generally, a component segmentation model is trained based on annotation data from vehicle component contours, and can segment components in an unknown vehicle image after completing the training. For example, the segmentation result output from the component segmentation model is displayed as a mask covering a specific component.

Figure 4C:
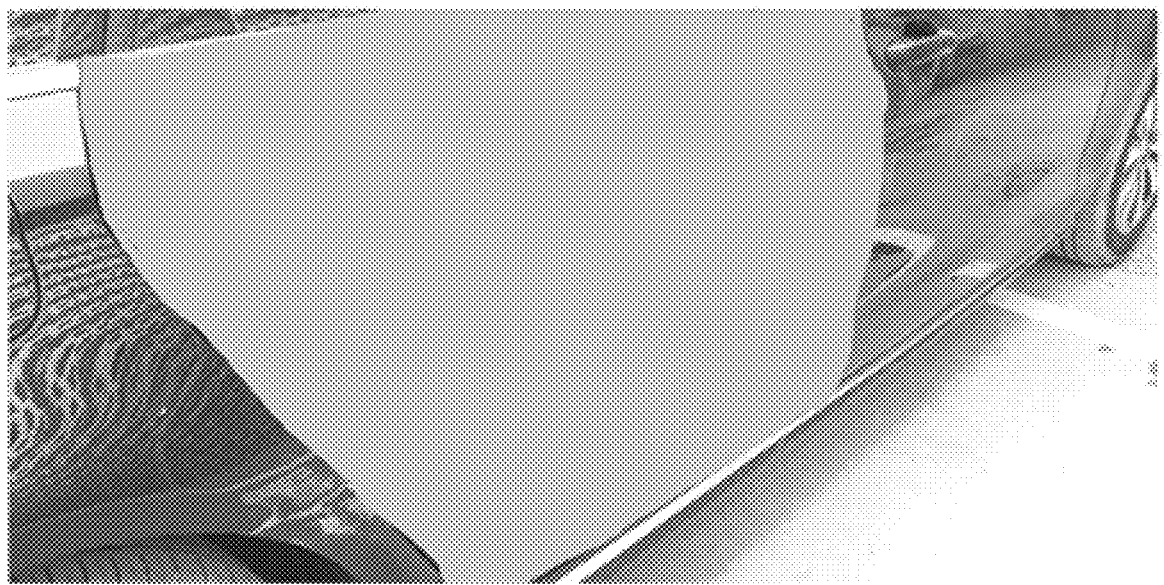
FIG. 4C shows an example of component segmentation information obtained for the vehicle damage image shown in FIG. 3.

FIG. 4C shows an example of component segmentation information obtained for the vehicle damage image shown in FIG. 3. It can be seen that on the basis of FIG. 3, FIG. 4C covers a region of the right rear door with a mask, thereby achieving corresponding component segmentation. It should be understood that, for simple and clear illustration, FIG. 4C shows merely the mask covering the right rear door component, but does not show masks covering other components. However, the component segmentation model can output segmentation information or contour information of each component simultaneously.

In the present art, various target segmentation models have been presented based on various network structures and various segmentation algorithms, such as segmentation models based on a CRF (conditional random field), or Mask R-CNN models. The component segmentation model can be implemented using any segmentation algorithm.

In an embodiment, the component detection model and component segmentation model are implemented using two stand-alone models that output component object detection information and component segmentation information, respectively.

In another embodiment, some neural network models can be configured to perform component detection and segmentation simultaneously. For example, the Mask R-CNN model can support three tasks, namely target detection, target classification, and target segmentation. Therefore, in an embodiment, the Mask R-CNN model structure may be employed as the component model in step 22. In such a case, component detection and component segmentation can be considered as two branches of the overall component model.

Thus, step 23 includes acquiring vehicle component information in a vehicle damage image. The vehicle component information includes component object detection information and component segmentation information.

Step 22 and step 23 may be executed in parallel or in any sequential order, which is not limited here.

After acquiring damage object detection information in step 22 and acquiring vehicle component information in step 23, a component-level damage feature is generated based on fusion of the two pieces of information in step 24. The component-level damage feature is collected using the component as a unit and is a comprehensive damage feature of the component.

For a given component, the component is referred to as a first component for illustrative purpose, and a component-level damage feature (hereinafter referred to as a first comprehensive feature) can be generated for the first component based on the damage object detection information and the vehicle component information. Specifically, the first comprehensive feature includes a component feature and a fused damage feature of the first component. The fused damage feature is obtained by fusing damage features of at least one damage detection frame belonging to the first component among the plurality of damage detection frames identified in step 22. In an embodiment, the first comprehensive feature is obtained by stitching the component feature and the fused damage feature of the first component together.

Next, acquiring a component feature of the first component is described.

As is well known to those skilled in the art, in step 23, the component model needs to first perform feature extraction on the vehicle damage image to acquire the vehicle component information. More specifically, in an embodiment, the component model employs a model architecture based on a convolutional neural network (CNN), including R-CNN, Fast R-CNN, Mask R-CNN, and the like. The convolutional neural network (CNN) includes a plurality of convolutional layers, and is configured to perform convolution processing on a to-be-identified image to obtain a convolutional feature map. The convolutional feature map reflects extracted features of image content. Subsequent component classification, component frame regression, and component segmentation in the component model are all performed based on the convolutional features in the convolutional feature map.

Therefore, in an embodiment, an image convolutional feature associated with the first component can be acquired from a convolutional layer of a convolutional neural network corresponding to the component model for use as the component feature.

In an embodiment, a portion of the vehicle component information output from the component model and associated with the first component may be further used as a part of the component feature, e.g., the first component's segmentation result feature, prediction result feature, etc.

Next, acquiring a fused damage feature of the first component is described.

Figure 5:
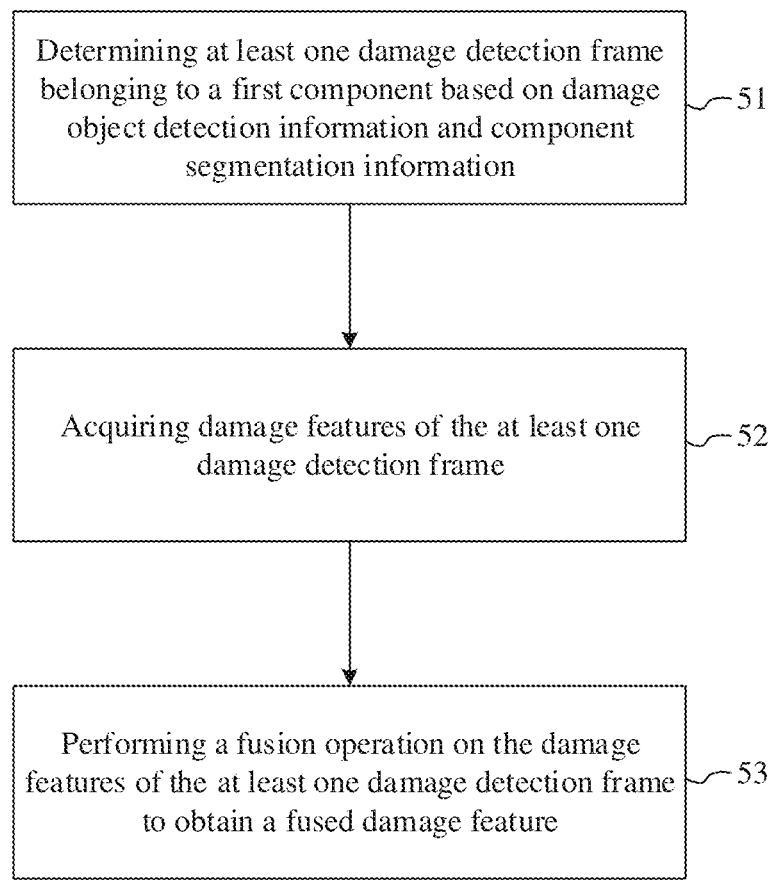
FIG. 5 shows a step-by-step process flowchart of acquiring a fused damage feature according to an embodiment.

FIG. 5 shows a flowchart of a process 500 of acquiring a fused damage feature according to an embodiment. It can be understood that these steps are all sub-steps of step 24 in FIG. 2. As shown in FIG. 5, in order to acquire a fused damage feature of the first component, first, in step 51, at least one damage detection frame belonging to the first component is determined based on damage object detection information and component segmentation information.

As mentioned above, the damage object detection information is provided in step 22, including a plurality of damage detection frames identified for the vehicle damage image, and the predicted damage category for each damage detection frame, as shown in FIG. 4A. The component segmentation information is provided in step 23, including information of regional division of the image, for example, presented as a mask covering a particular component, as shown in FIG. 4C. Based on the two pieces of information, at least one damage detection frame corresponding to a damage object of the first component can be determined.

Specifically, segmentation information of the first component can be first extracted from the component segmentation information, thereby determining a region covered by the first component, which is referred to as a first region. A description will be provided below by taking as an example using the component covered by the mask in FIG. 4C as the first component. In this example, the region covered by the gray mask is the first region.

Then, whether each damage detection frame falls within the first region is determined based on position information of the plurality of damage detection frames included in the damage object detection information. Whether a damage detection frame falls within the first region can be determined according to various specific criteria. For example, in one instance, if the center of a damage detection frame is located in the first region, then the damage detection frame is considered to fall within the first region; or, in another instance, if a preset proportion (e.g., 50%) or more of the whole area of a damage detection frame falls within the first region, then the damage detection frame is considered to fall within the first region.

Based on the aforementioned determination, a damage detection frame falling within the first region is determined to be the at least one damage detection frame.

Figure 4D:
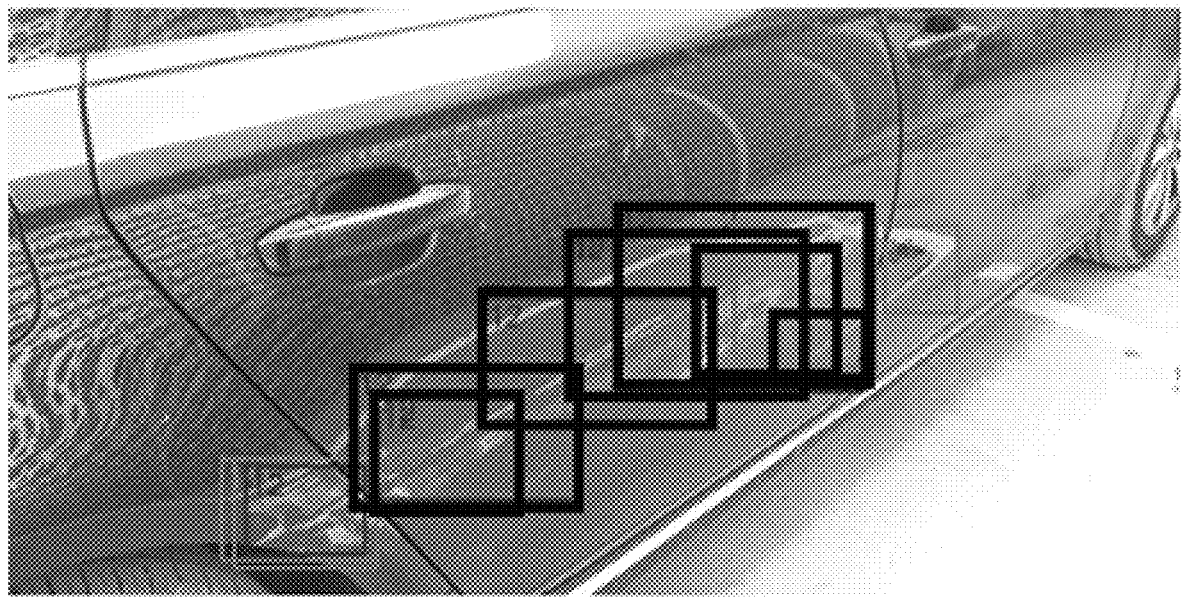
FIG. 4D shows an example of damage detection frames of a first component.

For example, for the first component covered by the mask in FIG. 4C, at least one damage detection frame belonging to the first component can be determined from the plurality of damage detection frames in FIG. 4A. FIG. 4D shows an example of damage detection frames belonging to the first component, where the thick lines represent the frames falling within the mask region and thus considered to be the damage detection frames belonging to the first component.

In this manner, in step 51, at least one damage detection frame belonging to the first component are determined.

Next, in step 52, damage features of the at least one damage detection frame are acquired.

In an embodiment, the damage feature of a damage detection frame includes an image convolutional feature corresponding to the damage detection frame. It can be understood that the damage detection frame is obtained by a damage detection model, and the damage detection model may be implemented by a convolutional neural network (CNN) architecture. For example, the convolutional neural network (CNN) performs convolution processing on an image through a convolutional layer, to obtain a convolutional feature map. The damage detection model performs damage classification and damage detection frame regression based on the convolutional feature map. The damage detection frames output from the damage detection model may correspond to sub-regions in the convolutional feature map. The image convolutional feature corresponding to each damage detection frame can be obtained by feature extraction of each sub-region.

For illustrative purpose, any damage detection frame of the at least one damage detection frame may be referred to as a first damage detection frame. Therefore, in an embodiment, an image convolutional feature associated with the first damage detection frame can be extracted from a convolutional layer of a convolutional neural network corresponding to the damage detection model for use as a corresponding damage feature.

In an embodiment, the damage feature of the damage detection frame further includes an association feature with other damage detection frames. Continuing to take any first damage detection frame as an example, determining the damage feature of the first damage detection frame further includes determining the association feature of the first damage detection frame based on an association relationship between the first damage detection frame and other damage detection frames, for use as a part of the damage feature of the first damage detection frame. In various embodiments, the association relationship may include an association relationship among damage detection frame positions, an association relationship among predicted damage categories, an association relationship among frame contents reflected by the image convolutional feature, and the like.

In an embodiment, the association relationship includes an association relationship among frame contents, i.e., an association relationship between image features within a frame. The frame contents can be reflected by the image convolutional feature. In an embodiment, assuming that the image convolutional feature corresponding to the first damage detection frame may be denoted as a feature vector F1, and an image convolutional feature corresponding to another damage detection frame (referred to as a second damage detection frame) is denoted as a feature vector F2, then the association relationship among frame contents between the first damage detection frame and the second damage detection frame may be expressed as an association relationship between the feature vector F1 and the feature vector F2, e.g., the degree of similarity.

In an example, a distance between the feature vector F1 and the feature vector F2, e.g., a Euclidean distance, or a cosine distance, is determined for use as the degree of similarity between the two feature vectors, and then as the association relationship among frame contents between the first damage detection frame and the second damage detection frame.

In another example, a dot product of the feature vector F1 and the feature vector F2 is calculated for use as the association relationship among frame contents between the first damage detection frame and the second damage detection frame.

In other examples, the association relationship among frame contents between the two damage detection frames may be determined by other approaches.

Further, in an embodiment, the association relationship may also include an association relationship among damage detection frame positions. A description will be provided below, still taking the first damage detection frame and the second damage detection frame as an example.

It can be understood that, in step 21, the damage detection frame information output from the damage detection model includes the position parameters of each damage detection frame. Generally, the position parameter of a damage detection frame often takes a form of (x,y,w,h), where (x, y) denotes the center coordinates of the detection frame, w is the width of the detection frame, and h is the height of the detection frame. A position association feature between the first damage detection frame and any second damage detection frame can be determined based on these position parameters.

According to various embodiments, the position association feature may include one or more of the following items: a center distance, an intersection over union, an area ratio, an inclusion relationship, or the like. The intersection over union (IoU) denotes the ratio of the area of overlap to the area of a union of two damage detection frames. The inclusion relationship may be the first damage detection frame including/excluding the second damage detection frame, or the second damage detection frame including/excluding the first damage detection frame, or the like.

Further, according to an embodiment, the association relationship may also include the association relationship among predicted damage categories. A description will be provided still taking the first damage detection frame and the second damage detection frame as an example.

In an embodiment, the damage object detection information output from the damage detection model in step 22 includes a predicted damage category for each damage detection frame. Therefore, the predicted damage category of the first damage detection frame can be acquired and denoted as a first category, and the predicted damage category of the second damage detection frame can be acquired and denoted as a second category. For example, the first category corresponds to scratching, the second category corresponds to deformation, and the like. In an example, the damage category association relationship of the first category and the second category can be determined based on a comparison of the first category and the second category, i.e., whether they are identical or different. In an embodiment, the damage detection model outputs not only a predicted damage category of each damage detection frame, but also a predicted confidence level, e.g., a first confidence level corresponding to the first category, and a second confidence level corresponding to the second category. In such a case, a predicted damage category association feature for the first damage detection frame and the second damage detection frame may include the similarity or difference between the first category and the second category, and the difference between the first confidence level and the second confidence level.

A process of calculating various association features (one or more of a frame content association feature, a position association feature, or a predicted category association feature) is described above in combination with a certain other damage detection frame (the second damage detection frame). It can be understood that the process may be applicable to calculating an association feature of the first damage detection frame and any other damage detection frame. On the basis of determining association features for the first damage detection frame and each of the other damage detection frames, these association features can be stitched or combined, thereby obtaining an overall association feature of the first damage detection frame and other damage detection frames.

As mentioned above, a damage feature of the first damage detection frame is acquired. The damage feature of the first damage detection frame includes the image convolutional feature of the first damage detection frame, and may further include association features of the first damage detection frame with the other damage detection frames. The feature acquisition is performed on each damage detection frame belonging to the first component, thus obtaining a damage feature for each of the at least one damage detection frame belonging to the first component.

Next, in step 53, a fusion operation on the damage features of the at least one damage detection frame is performed to obtain a fused damage feature. In various embodiments, the fusion operation may be an operation to obtain the maximum, the minimum, the average, the sum, the median, or the like, or may be a combination of these operations.

A fused damage feature of the first component is acquired through the steps 51 to 53.

Thus, the component feature and the fused damage feature of the first component are acquired, respectively. Based on this, the acquired component feature and fused damage feature of the first component are stitched or combined, to obtain a component-level damage feature, i.e., a first comprehensive feature, of the first component.

In an example, the first comprehensive feature is denoted as V1, and may be expressed as:

$$V1=(C1,S1)$$

where C1 denotes the component feature of the first component, and S1 denotes the fused damage feature of the first component.

As mentioned above, feature extraction of the first component is implemented.

Next, referring back to FIG. 2, in step 25, a plurality of candidate prediction results for the first component are determined. Each of the candidate prediction results includes a candidate component category and a candidate damage category. In other words, each of the candidate prediction results is a two-element set of a candidate component category and a candidate damage category. The two-element set shows a possible combination of the component category of the first component and the damage category of the overall damage to the component.

In an embodiment, each predefined component category is combined with each predefined damage category, and all the two-element sets obtained by the combination are used as the candidate prediction results. Such an approach may be referred to as a full permutation approach. For example, in an embodiment, assuming that a vehicle is pre-divided into 100 components, and 20 damage categories are pre-defined, then each component category can be combined with each damage category to obtain 2000 two-element sets for use as the candidate prediction results.

In general, two-element sets obtained by the full permutation approach are most comprehensive, but they may be a large number of two-element sets and a heavy workload in subsequent processing. Therefore, in an embodiment, only a part thereof is selected for use as the candidate prediction results. For example, component categories and damage categories having greater probabilities of being used as final prediction results can be selected based on information associated with a predicted category among the damage object detection information and component object detection information, for use as the candidate prediction results.

As mentioned above, in step 23, the component object detection information output from the component model may further include a predicted component category for each component. Therefore, a predicted component category for the first component can be acquired from the component object detection information. The predicted component category is referred to as a first predicted component category, and is used as the candidate component category.

In general, the component model will output the component category with the highest confidence level as the predicted component category. However, in an embodiment, the component model also simultaneously outputs the confidence levels or probabilities of a plurality of component categories corresponding to the component. In such a case, the first predicted component category may include one or more predicted component categories of high confidence levels.

For example, as shown in FIG. 4B and FIG. 4C, using the component covered by the mask as the first component as an example, as can be seen from FIG. 4B, the component model identifies the category of the first component as 102: right rear door. Accordingly, "102: right rear door" can be used as the candidate component category.

In an example, the component model further outputs the confidence level corresponding to "102: right rear door" for the component as 55%, the confidence level corresponding to "101: right front door" for the component as 40%, and the confidence level corresponding to "105: left rear door" for the component as 5%. In such a case, the predicted component categories "102: right rear door" and "101: right front door" having high confidence levels (e.g., higher than a preset threshold, such as 35%) may both be used as candidate component categories.

Similarly, the candidate damage category can be determined based on the damage object detection information. For example, as mentioned above, the damage object detection information output from the damage detection model may include a predicted damage category corresponding to each damage detection frame. Thus, after determining at least one damage detection frame belonging to the first component in step 51, at least one predicted damage category corresponding to the at least one damage detection frame can be acquired to determine the candidate damage category based on these predicted damage categories.

For example, in one instance, 6 damage detection frames are determined to belong to the first component, and the predicted damage categories corresponding to the 6 damage detection frames are: 12 (scratching), 12 (scratching), 11 (tearing), 10 (deformation), 12 (scratching), and 12 (scratching), respectively.

In an embodiment, the damage category accounting for the highest proportion of the predicted damage categories is used as the candidate damage category. For example, in the aforementioned example, 12 (scratching) accounts for the highest proportion and is used as the candidate damage category.

In an embodiment, the category having the highest damage degree of the predicted damage categories is used as the candidate damage category. It can be understood that a damage degree can be preset for each damage category, and thus the predicted damage categories can be sorted based on the damage degree to determine the category having the highest damage degree. For example, in the aforementioned example, 11 (tearing) has the highest damage degree, and can be used as the candidate damage category.

In another embodiment, each category of the at least one predicted damage category is directly used as a candidate damage category. For example, for the aforementioned example, 3 candidate damage categories are directly acquired: 12 (scratching), 11 (tearing), and 10 (deformation).

Candidate component categories and candidate damage categories are acquired respectively by the aforementioned approaches. The acquired candidate component categories and the acquired candidate damage categories are combined to obtain a plurality of two-element sets for use as the candidate prediction results.

In an example, assuming that the acquired candidate component categories include "102: right rear door" and "101: right front door", and the acquired candidate damage categories include 12 (scratching), 11 (tearing), and 10 (deformation), then the following 6 two-element sets can be obtained by combination:

(right rear door, scratching)
(right rear door, tearing)
(right rear door, deformation)

(right front door, scratching)
(right front door, tearing)
(right front door, deformation)

These two-element sets are used as the candidate prediction results.

As mentioned above, vehicle damage assessment finally needs to determine, from the vehicle damage image, the components that have been damaged, and the categories or degrees of damage to the components. It can be seen that each two-element set obtained above is a possible conjecture of the damage assessment result. Next, a prediction model needs to be used to determine which conjecture has a higher probability of being correct based on the component-level damage feature.

Thus, the component-level damage feature extracted for the first component in step 24 and the candidate prediction results determined in step 25 are then input into the prediction model, so that the prediction model determines a correctness probability for each candidate prediction result based on the component-level damage feature.

It should be understood that by training the prediction model based on annotation data, the aforementioned prediction can be realized. If it is necessary to predict and determine the correctness of both the component category and the damage category in a two-element set, then annotation data annotating the two aspects are required. However, in existing model training sample libraries, such annotation data is relatively rare. In another aspect, in order to train the damage detection model, there are a large number of annotation samples annotating damages; and in order to train the component model, there are also a large number of annotation samples annotating components. Based on this, according to the embodiments of the present specification, a condition prediction model can be trained based on such annotation samples to predict and determine the correctness of some elements in the two-element sets.

As shown in FIG. 2, step 26 includes inputting the first comprehensive feature corresponding to the first component and the candidate prediction results into a pre-trained first condition prediction model to obtain a first prediction result, the first prediction result including, for each of the candidate prediction results, a probability that the candidate damage category of the candidate prediction result is correct; and step 27 includes inputting the first comprehensive feature and the candidate prediction results into a pre-trained second condition prediction model to obtain a second prediction result, the second prediction result including, for each of the candidate prediction results, a probability that the candidate component category thereof is correct.

It should be understood that step 26 and step 27 may be executed in parallel or in any sequential order, which is not limited here.

Training and use of the first condition prediction model and the second condition prediction model will be described below separately.

As mentioned above, the first condition prediction model is configured to predict the probability that a damage category in a two-element set of the candidate prediction results is correct based on the component-level damage feature. Therefore, the first condition prediction model is trained at least based on annotation samples with manual damage annotations. For example, the training samples required for the first condition prediction model include training images and damage annotation data for the training images. Because the first condition prediction model needs to determine an overall damage category of a damaged component (i.e., the candidate damage category in the two-element set), the required damage annotation data at least include overall damage category tags for each damaged component in the training image.

However, in training a conventional damage detection model, each damage object in the training image is manually annotated. Therefore, only by further processing conventional annotation data can the desired damage annotation data be obtained.

Figure 6:
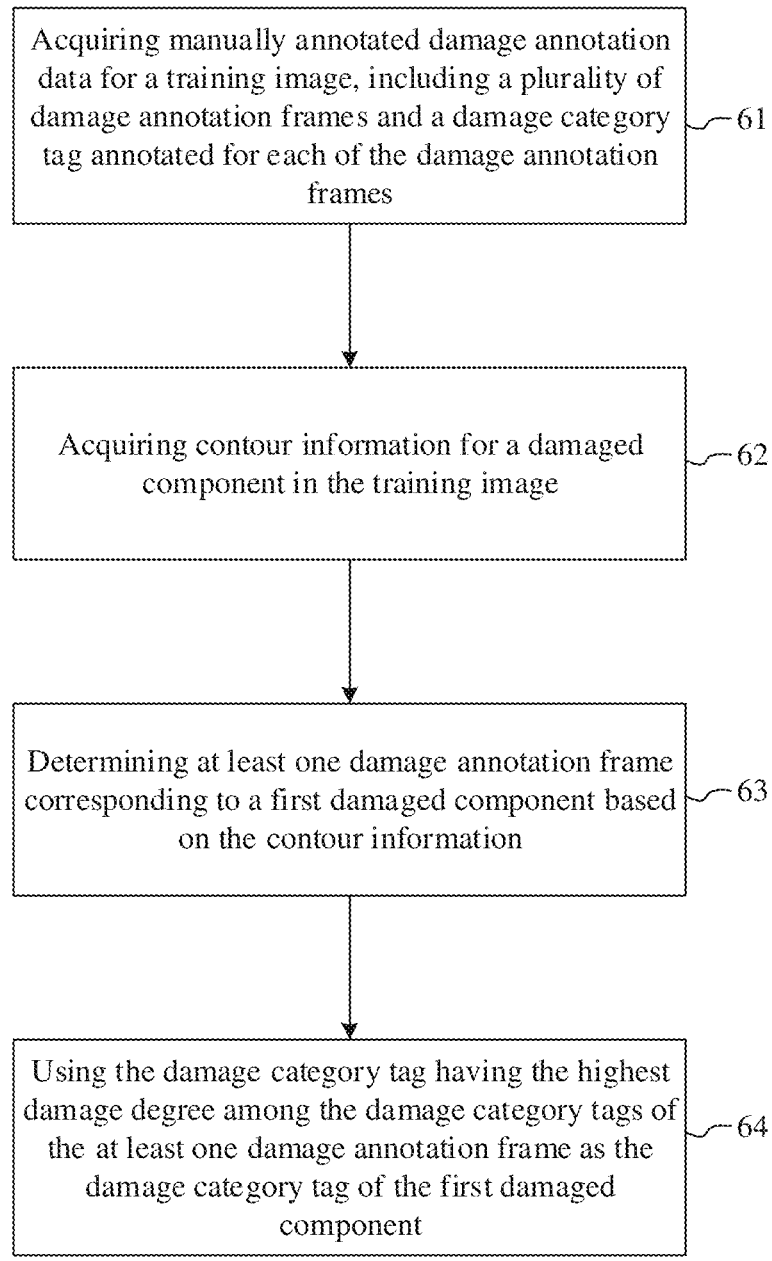
FIG. 6 shows a step-by-step flowchart of generating damage annotation data according to an embodiment.

FIG. 6 shows a step-by-step flowchart of a process 600 of generating damage annotation data according to an embodiment. A description will be provided below in combination with an example of a specific training image.

Figure 7A:
FIG. 7A shows an example of an original image of a training image.

FIG. 7A shows an example of an original image of a training image. The training image can be distributed to an annotator for annotation.

Thus, manually annotated damage annotation data for a training image can be acquired in step 61 of FIG. 6. The damage annotation data include a plurality of damage annotation frames annotated in the training image and a damage category tag annotated for each of the damage annotation frames.

Figure 7B:
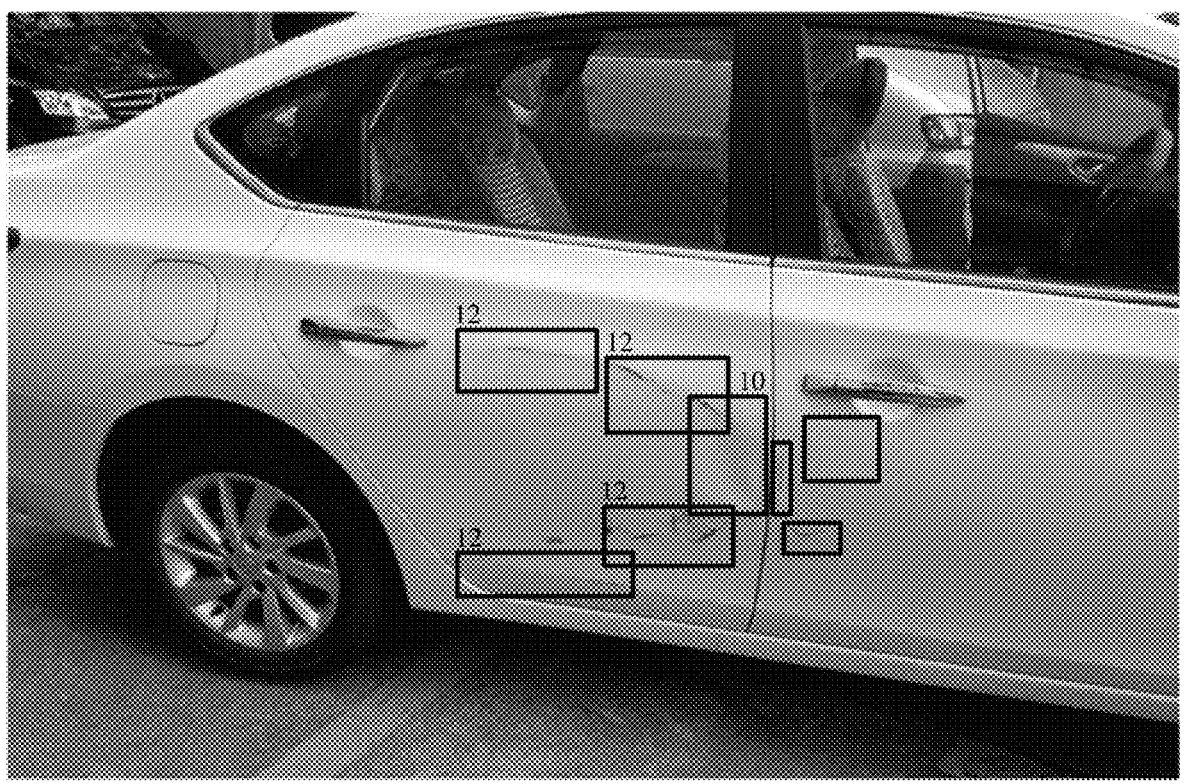
FIG. 7B shows annotation data obtained by manual annotation for the training image of FIG. 7A.

FIG. 7B shows annotation data obtained by manual annotation for the training image of FIG. 7A. It can be seen that an annotator has framed regions of damage objects therein using rectangular frames. These rectangular frames can be referred to as damage annotation frames. In addition, for each damage object, the annotator has further annotated the category of the damage object, e.g., 12 corresponds to scratching, and 10 corresponds to deformation. The damage categories may be annotated by a variety of approaches, including not only denoting different damage categories using different numerals as shown in FIG. 7B, but also denoting different damage categories using, for example, annotation frames in different colors, and the like. FIG. 7B is merely one example.

In addition, in step 62, contour information for a damaged component in the training image is acquired.

In an embodiment, the contour information of the damaged component is generated by an annotator through annotation. The annotator annotating the contour information may be the same annotator annotating the damage frame, or may be a different annotator.

In an embodiment, the contour information of the damaged component is generated by a component segmentation model. That is, the training image is input into a trained component segmentation model, to obtain the contour information of the component based on the model's output results.

Figure 7C:
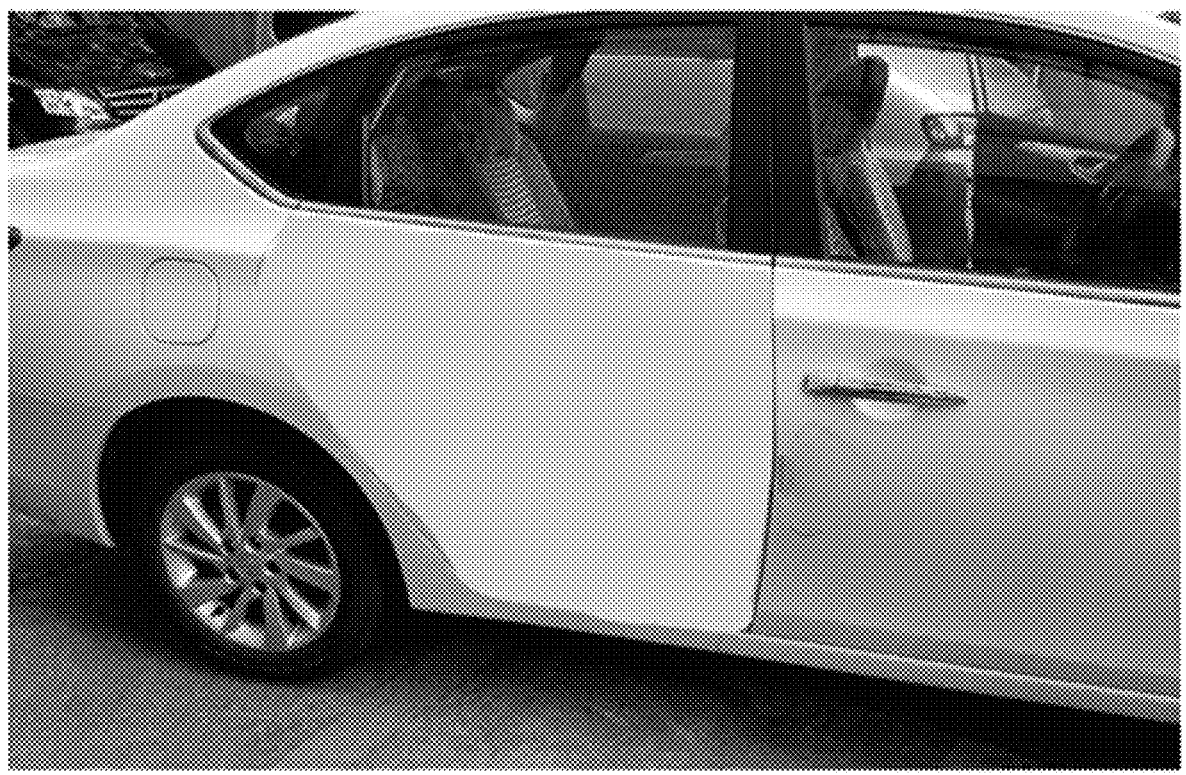
FIG. 7C shows contour information of a damaged component acquired in an example.

FIG. 7C shows contour information of a damaged component acquired in an example. The contour information is obtained based on output of a component segmentation model. As shown in FIG. 7C, the region of a component covered by a mask is used as its contour information. The component is referred to as a first damaged component hereinafter, and is taken as an example for description.

Next, in step 63, based on the contour information of the damaged component, for each damage annotation frame obtained in step 61, which damaged component corresponds to the damage annotation frame is determined. In other words, for each damaged component, a damage annotation frame corresponding to the damaged component is determined. For example, for the first damaged component, at least one damage annotation frame corresponding to the component is determined.

For example, the damage annotation frame corresponding to the first damaged component can be determined based on the position information of the damage annotation frames and the regional information of the region covered by the first damaged component. The process is similar to the step 51 in FIG. 5. The description will not be repeated.

Figure 7D:
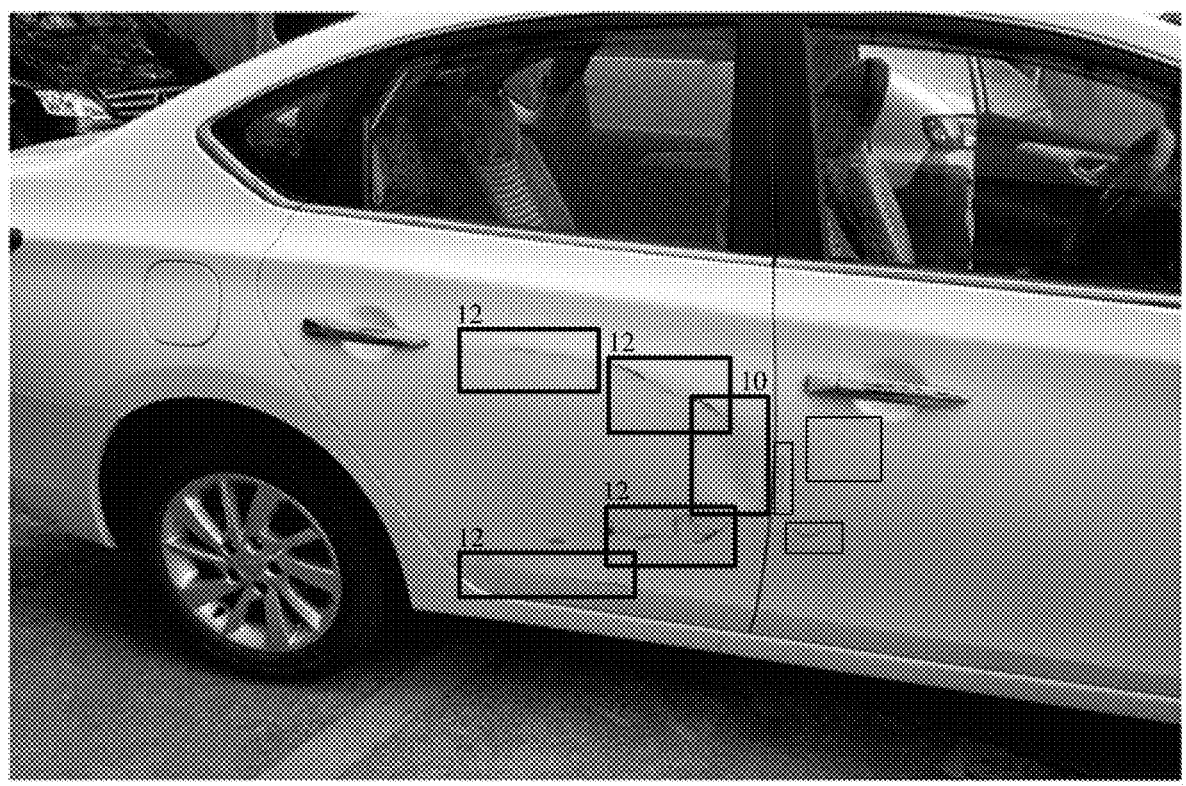
FIG. 7D shows damage annotation frames belonging to a first damaged component in an example.

FIG. 7D shows damage annotation frames belonging to a first damaged component in an example. It can be seen that, as determined in step 63, among the 8 damage annotation frames annotated in FIG. 7B, 5 damage annotation frames correspond to the first damaged component. The 5 damage annotation frames are shown by thick lines in FIG. 7D.

Next, in step 64, the damage category tag having the highest damage degree among the damage category tags of the at least one damage annotation frame corresponding to the first damaged component is used as the damage category tag of the first damaged component.

For example, as shown in FIG. 7D, 5 damage annotation frames correspond to the first damaged component. The damage category tags corresponding to the 5 damage annotation frames include category 12 denoting scratching, and category 10 denoting deformation. Based on a predefined order of damage degrees, the damage degree of deformation is higher than that of scratching, so category 10 (deformation) can be used as the overall damage category tag of the first damaged component.

The above steps are also employed for other damaged components. Thus, based on damage annotation frames and damage categories annotated by an annotator, an overall damage category tag is generated for each damaged component for use as required damage annotation data.

On the basis of the required damage annotation data generated for the training image, the training image and corresponding damage annotation data constitute a complete training sample and can be used for training a first condition prediction model.

In a process of training the first condition prediction model, the component-level damage feature of each component in the training image is first acquired by feature extraction on the training image. This process is similar to the step 21 to step 23, except that the input image is the original training image. Similarly, the obtained component-level damage feature includes a component feature of a damaged component in the training image and a fused damage feature of the component.

Next, the component-level damage feature of a damaged component in the training image is input into the first condition prediction model. The first condition prediction model processes the input feature to provide a predicted value about the damage category of the component. By comparing the predicted value to the overall damage category tag for the damaged component in the damage annotation data, a prediction error is determined, and then model parameters are adjusted by feeding back the error, thereby achieving model training.

As can be seen from the above process, the training data on which the first condition prediction model is based mainly include annotation data on component-level overall damage, and error in the training process is determined mainly based on the difference between a predicted value for component-level damage and an annotated value, so it follows that processing in the prediction process is also more focused on processing of fused damage features of component-level damage features.

Referring back to FIG. 2, after completing training of the first condition prediction model, the component-level damage feature, i.e., the first comprehensive feature, of the first component is obtained by extraction from a to-be-identified image according to steps 22 to 24, and then the first comprehensive feature and two-element sets of candidate prediction results are input into the first condition prediction model. The first condition prediction model processes the first comprehensive feature, thereby obtaining an overall damage category prediction result for the first component, including a predicted category and a predicted confidence level. Based on comparison of the prediction result and the candidate damage category in each two-element set, a probability that the candidate damage category is correct is obtained for each two-element set.

It should be noted that since the training data of the first condition prediction model have no annotations of component categories, the first condition prediction model neither predicts the component category, nor determines the correctness of the candidate component category in the two-element set. In other words, a first prediction result output from the first condition prediction model denotes, for each candidate prediction result, a probability that the candidate damage category is correct if the candidate component category thereof is correct.

Training and use of a second condition prediction model will be described below.

As mentioned above, the second condition prediction model is configured to predict the probability that the candidate component category in a two-element set of the candidate prediction results is correct based on the component-level damage feature. Therefore, the second condition prediction model is trained at least based on annotation samples with manual component annotations. For example, the training samples required for the second condition prediction model include a training image and annotation data, where the annotation data at least include component category tags manually annotated for damaged components in the training image.

It can be understood that a large number of component annotation samples exist for training the component model in step 23. These annotation samples can be used to train the second condition prediction model.

In a process of training the second condition prediction model, feature extraction on the training image is first performed. Unlike a conventional component model that only extracts the component feature, the second condition prediction model needs to acquire the component-level damage feature of each component in the training image. This process is similar to the step 22 to step 24, except that the input image is the original training image. Similarly, the obtained component-level damage feature includes a component feature of a damaged component in a training image and a fused damage feature of the component.

Next, the component-level damage feature of a damaged component in the training image is input into the second condition prediction model. The second condition prediction model processes the input feature to give a predicted value about the component category of the component. By comparing the predicted value to the annotated component category tag, a prediction error is determined, and then model parameters are adjusted by feeding back the error, thereby achieving model training.

Thus, after completing training of the second condition prediction model, the component-level damage feature, i.e., the first comprehensive feature, of the first component is obtained by extraction from a to-be-identified image according to steps 22 to 24, and then the first comprehensive feature and two-element sets of candidate prediction results are input into the second condition prediction model. The second condition prediction model processes the first comprehensive feature, thereby obtaining a component category prediction result for the first component, including the predicted category and the predicted confidence level. Based on comparison of the prediction result and the candidate component category in each two-element set, the probability that the candidate component category is correct is obtained for each two-element set.

It should be noted that since the training data of the second condition prediction model have no annotations of overall damage categories, the second condition prediction model neither predicts the damage category, nor determines correctness of the candidate damage category in the two-element set. In other words, a second prediction result output from the second condition prediction model denotes, for each candidate prediction result, the probability that the candidate component category is correct if the candidate damage category thereof is correct.

Thus, steps 26 and 27 of FIG. 2 include inputting the first comprehensive feature and the candidate prediction results into the first condition prediction model and the second condition prediction model, respectively, to obtain the first prediction result and the second prediction result. The first prediction result shows, in each of the two-element sets of the candidate prediction results, a probability that the candidate damage category is correct, and the second prediction result shows, in each of the two-element sets of the candidate prediction results, the probability that the candidate component category is correct.

Next, step 28 includes determining the component category of the first component and a corresponding damage category thereof at least based on the first prediction result and the second prediction result.

FIG. 8 shows a step-by-step flowchart of a process 800 of determining a component category and a damage category based on a first prediction result and a second prediction result in an embodiment. It can be understood that the steps in FIG. 8 are sub-steps of the step 28. As shown in FIG. 8, first, in step 81, for each candidate prediction result, a first probability corresponding to the candidate prediction result is acquired from the first prediction result, and a second probability corresponding to the candidate prediction result is acquired from the second prediction result.

As mentioned above, each candidate prediction result is presented as a two-element set. In step 81, for each two-element set, a probability, i.e., the first probability, for the two-element set is acquired from the first prediction result, the first probability denoting the probability that the candidate damage category of the two-element set is correct; and a probability, i.e., the second probability, for the two-element set is acquired from the second prediction result, the second probability denoting the probability that the candidate component category of the two-element set is correct.

Next, in step 82, a comprehensive correctness probability of each candidate prediction result, i.e., a comprehensive correctness probability of the whole two-element set, is determined based on the first probability and the second probability.

In an example, the maximum of the first probability and the second probability is used as the comprehensive correctness probability.

In another example, the sum of the first probability and the second probability is used as the comprehensive correctness probability.

In still another example, considering that the first probability and the second probability are conditional probabilities of individual elements of the two-element set being correct, the product of the first probability and the second probability is used as the comprehensive correctness probability.

The following Table 1 shows, for the 6 two-element sets created in the aforesaid examples, examples of the first probabilities, second probabilities, and comprehensive correctness probabilities thereof, where the comprehensive correctness probability is obtained by multiplying the first probability by the second probability.

TABLE 1

| Two-element set | First probability | Second probability | Comprehensive correctness probability |
|---|---|---|---|
| (Right rear door, scratching) | 60% | 80% | 48% |
| (Right rear door, tearing) | 10% | 80% | 18% |
| (Right rear door, deformation) | 30% | 80% | 24% |
| (Right front door, scratching) | 60% | 20% | 12% |
| (Right front door, tearing) | 10% | 20% | 2% |
| (Right front door, deformation) | 30% | 20% | 6% |

It can be understood that the comprehensive correctness probability for a two-element set can also be determined by other approaches, such as averaging, which are not enumerated here.

In step 83, at least one prediction result is selected from the plurality of candidate prediction results based on the comprehensive correctness probabilities after determining the comprehensive correctness probability for each candidate prediction result. In an embodiment, the prediction result of the highest comprehensive correctness probability can be selected from the plurality of candidate prediction results. In another embodiment, candidate prediction results having comprehensive correctness probabilities reaching a certain predetermined threshold can be selected. In still another embodiment, a predetermined number of candidate prediction results may be further selected from the plurality of candidate prediction results in a descending order of the comprehensive correctness probability.

Next, in step 84, the component category of the first component and the corresponding damage category are determined based on the candidate component categories and the candidate damage categories included in the at least one prediction result selected in step 83.

When only one candidate prediction result is selected in step 83, the candidate component category in the two-element set of the prediction result is determined for use as the component category of the first component, and the candidate damage category thereof is used as an overall damage category of the first component.

In an embodiment, a plurality of two-element sets of the candidate prediction results are selected in step 83. For the plurality of candidate two-element sets, if the candidate component categories thereof are identical, then the identical candidate component category is used as the component category of the first component in step 84. If the candidate component categories thereof are different, then the candidate component category in the two-element set of the highest second probability is used as the component category of the first component in step 84. In an embodiment, if a plurality of candidate two-element sets are selected in step 83, then it means a damage assessment result in which a component has multiple types of damage, and then candidate damage categories in the plurality of two-element sets may all be selected for use as the overall damage categories of the first component. In another embodiment, the category of the highest damage degree among the candidate damage categories included in the plurality of two-element sets selected in step 83 is used as the overall damage category of the first component.

For example, the comprehensive correctness probabilities of the two-element sets are shown in Table 1. In an example, the two-element set (right rear door, scratching) having the highest comprehensive correctness probability is selected based on Table 1 in step 83. Consequently, the candidate component category "right back door" of the selected two-element set is used as the component category of the analyzed first component, and the candidate damage category "scratching" of the two-element set is used as the overall damage category of the first component in step 84. Thus, it is determined that the right rear door has scratching damage.

In another example, 2 two-element sets: (right rear door, scratching) and (right rear door, deformation) having comprehensive correctness probabilities higher than a certain threshold are selected in step 83. In step 84, the common candidate component category "right rear door" is used as the component category of the first component, and both scratching and deformation are used as the damage to the first component (the right rear door), i.e., it is determined that the right rear door was scratched and deformed. Alternatively, "deformation", having a higher damage degree, can be determined as the damage category of the right rear door, because the replacement or repair scheme for a component generally depends on the damage category having the highest damage degree of the component.

As mentioned above, the component category of the first component and the corresponding damage category thereof are determined based on the first prediction result and the second prediction result through the specific steps in FIG. 8. However, it should be understood that this is not the only execution approach, and step 28 can also be executed by other approaches. For example, in one execution approach, the comprehensive correctness probability for each two-element set is not directly calculated. The component category and the overall damage category of the first component are determined based on the remaining two-element sets after eliminating two-element sets each having a first probability lower than a certain threshold, and eliminating two-element sets each having a second probability lower than a certain threshold. On the basis of the specific embodiments described above, it is also possible to execute step 28 by other execution approaches.

Thus, in step 28, the component category of the first component and the corresponding damage category thereof are determined based on the first prediction result and the second prediction result. The first component is any component suspected of being damaged in a to-be-identified vehicle damage image, and therefore, for each component suspected of being damaged, the component category and the damage category of the component suspected of being damaged can be determined by extracting its component-level damage feature according to step 24 in FIG. 2, and by execution according to steps 25 to 28, thus determining which component of a vehicle in the vehicle damage image is damaged, and what damage is suffered by the component, and achieving smart damage assessment.

In the smart damage assessment process, the correctness of each of the two elements in the two-element sets of the candidate prediction results is predicted and assessed separately based on two condition prediction models, i.e., a first condition prediction model and a second condition prediction model. The first condition prediction model and the second condition prediction model can be trained based on existing annotation samples, to make better use of existing annotation data.

On this basis, more comprehensive annotation data can be further acquired to train a third prediction model. The third prediction model is configured to predict the probability that the candidate component category and the candidate damage category in a two-element set of the candidate prediction results are both correct, i.e., the probability that the whole two-element set is correct, based on the component-level damage feature. Training and use of the third prediction model will be described below.

Since the third prediction model is required to determine the correctness of each of the candidate component category and the candidate damage category of the candidate prediction results, the training samples required by the third prediction model include not only component category annotation data, but also damage category annotation data. For example, the training samples on which the third prediction model is based may include a training image and full annotation data. The full annotation data include component category tags manually annotated for the damaged components in the training image, and overall damage category tags manually annotated for the components.

Figure 9:
FIG. 9 shows annotation data of a training sample for training a third condition prediction model according to an embodiment.

FIG. 9 shows annotation data of a training sample for training a third condition prediction model according to an embodiment. The annotation data of FIG. 9 are generated by distributing the original training image shown in FIG. 7A to an annotator, and the annotator fully annotating the damaged components. "Fully annotating" includes annotating the components and annotating the damage. As shown in FIG. 9, having been annotated by an annotator, full annotation data at least include annotation of the component categories and overall damage categories of damaged components. The annotations also constitute annotation two-element sets (A, B), where A denotes the component category, and B denotes the overall damage category of the component. For example, (101,12) corresponds to (right front door, scratching), and (102,10) corresponds to (right rear door, deformation). In order to distinguish between different components, the full annotation data further need to contain annotation of the component contour. For example, in FIG. 9, thick lines are used to denote the contours of two damaged components.

The annotation sample thus constituted can be used for training a third prediction model. In a process of training the third prediction model, feature extraction on the training image is first performed. The process of feature extraction is similar to the step 21 to step 23, except that the input image is the original training image. Similarly, the obtained component-level damage feature includes the component feature and the fused damage feature of each damaged component in the training image.

Next, the component-level damage feature of a damaged component in the training image is input into the third prediction model. The third prediction model processes the input feature to give a first predicted value about the component category of the damaged component and a second predicted value about the overall damage category of the damaged component. In addition, an annotation two-element set corresponding to the damaged component is determined based on the annotated contours of the components, where the annotation two-element set includes a component category tag and a damage category tag. A prediction error is determined based on a comparison of the first predicted value with the component category tag and a comparison of the second predicted value with the damage category tag, and then model parameters are adjusted by feeding back the error, thereby achieving model training.

Thus, after completing training of the third prediction model, in an embodiment, the component-level damage feature, i.e., the first comprehensive feature, of the first component is obtained according to steps 22 to 24 in FIG. 2 for a to-be-identified image. The method of FIG. 2 further includes inputting the first comprehensive feature and the two-element sets of the candidate prediction results into the third prediction model. The third prediction model processes the first comprehensive feature, thereby obtaining a component category prediction result and an overall damage category prediction result of the first component. Each prediction result includes a predicted category and a confidence level. The two prediction results are respectively compared with the candidate component category and candidate damage category in each two-element set, to obtain an overall probability that the two-element set is correct based on the comparison results. In other words, the third prediction model outputs a third prediction result, including, for each two-element set of the candidate prediction results, a probability that the candidate damage category and the candidate component category thereof are both correct.

In cases where the third prediction model is used as mentioned above, in step 28 of FIG. 2, the component category of the first component and the corresponding damage category thereof can be determined based on the first prediction result output from the first condition prediction model, the second prediction result output from the second condition prediction model, and the third prediction result output from the third prediction model.

In cases where the third prediction model is used, step 28 can still be executed by an approach similar to the steps shown in FIG. 8, but the third prediction result is further introduced on the basis of FIG. 8. Specifically, this process may include the following steps.

First, for each two-element set of the candidate prediction results, a first probability corresponding to the candidate prediction result is acquired from the first prediction result, a second probability corresponding to the candidate prediction result is acquired from the second prediction result, and a third probability corresponding to the candidate prediction result is acquired from the third prediction result. This is similar to step 81.

Next, a comprehensive correctness probability for each candidate prediction result is determined based on the first probability, the second probability, and the third probability.

In an example, the comprehensive correctness probability can be determined directly based on the first probability, the second probability, and the third probability. For example, the minimum, maximum, sum, or average of the first probability, the second probability, and the third probability may be used as the comprehensive correctness probability.

In another example, a first comprehensive correctness probability can be first determined based on the first probability and the second probability with reference to the embodiment of step 82 in FIG. 8, and then a final comprehensive correctness probability can be determined based on the first comprehensive correctness probability and the third probability. For example, a product of the first probability and the second probability is used as the first comprehensive correctness probability, and then an average of the first comprehensive correctness probability and the third probability is used as the final comprehensive correctness probability.

The following Table 2 shows examples of first probabilities, second probabilities, third probabilities, and comprehensive correctness probabilities for the 6 two-element sets created in the above examples, where the comprehensive correctness probabilities are obtained by averaging the product of the first probability and the second probability with the third probability.

TABLE 2

| Two-element set | First probability | Second probability | Third probability | Comprehensive correctness probability |
|---|---|---|---|---|
| (Right rear door, scratching) | 60% | 80% | 50% | 49% |
| (Right rear door, tearing) | 10% | 80% | 14% | 16% |
| (Right rear door, deformation) | 30% | 80% | 20% | 22% |
| (Right front door, scratching) | 60% | 20% | 8% | 10% |
| (Right front door, tearing) | 10% | 20% | 4% | 3% |
| (Right front door, deformation) | 30% | 20% | 4% | 5% |

It can be understood that the comprehensive correctness probability of a two-element set can be further determined based on the three probabilities mentioned above by other approaches, which are not enumerated here.

Next, at least one prediction result is selected from a plurality of candidate prediction results based on the comprehensive correctness probabilities. The component category of the first component and the corresponding damage category are determined based on the candidate component category and the candidate damage category included in the at least one prediction result. The two steps can be executed by referring to the steps 83 and 84 of FIG. 8. The description will not be repeated.

Thus, the component category and the overall damage category of each component are determined based on the prediction results of the three prediction models.

On the basis of determining the component category and the damage category of each damaged component, in an embodiment, a component replacement or repair scheme can be determined accordingly.

It can be understood that a mapping table can be preset as required for damage assessment, where the mapping table records replacement or repair schemes for various types of components with various categories of damage. For example, for a metal component, when the damage category is scratching, the corresponding replacement or repair scheme is spray painting, and when the damage category is deformation, the corresponding replacement or repair scheme is sheet metal working; for a glass component, when the damage category is scratching, the corresponding replacement or repair scheme is glass replacement, and the like.

Thus, for the first component in the above example, assuming that it is determined that the component category is the right rear door and the damage category is scratching, then first, its type is determined to be, for example, a metal component based on the component category "right rear door." Next, based on the damage category "scratching", the corresponding replacement or repair scheme is determined to be: spray painting.

Thus, a replacement or repair scheme for each damaged component can be determined, thereby more comprehensively implementing the damage assessment process.

In the above embodiments, a vehicle damage situation is determined based on one to-be-identified vehicle damage image. The vehicle damage situation includes which components have been damaged, and the categories of damage to the components. On this basis, smart damage assessment can also be performed based on a plurality of vehicle damage images, thereby more comprehensively and accurately determining vehicle damage information. It should be understood that the plurality of vehicle damage images should be images belonging to the same vehicle damage assessment case. For example, users often take photos for a given vehicle damage case from different angles and/or different distances, to obtain a series of images. The series of images can be used as a plurality of vehicle damage images for the given case, to comprehensively determine the vehicle damage situation.

In an embodiment, the method shown in FIG. 2 is executed respectively for each vehicle damage image in a series of vehicle damage images, to obtain component category and damage category prediction results for each component. Then, the prediction results from the vehicle damage images are integrated, e.g., united, to obtain a damage assessment result for the entire case.

In another embodiment, considering the association among the series of images, features of the plurality of vehicle damage images are fused, and the fused feature is input into a prediction model to obtain the prediction result, thereby determining the damage assessment result. The method for assessing vehicle damage based on the concept of this embodiment will be described below.

Figure 10:
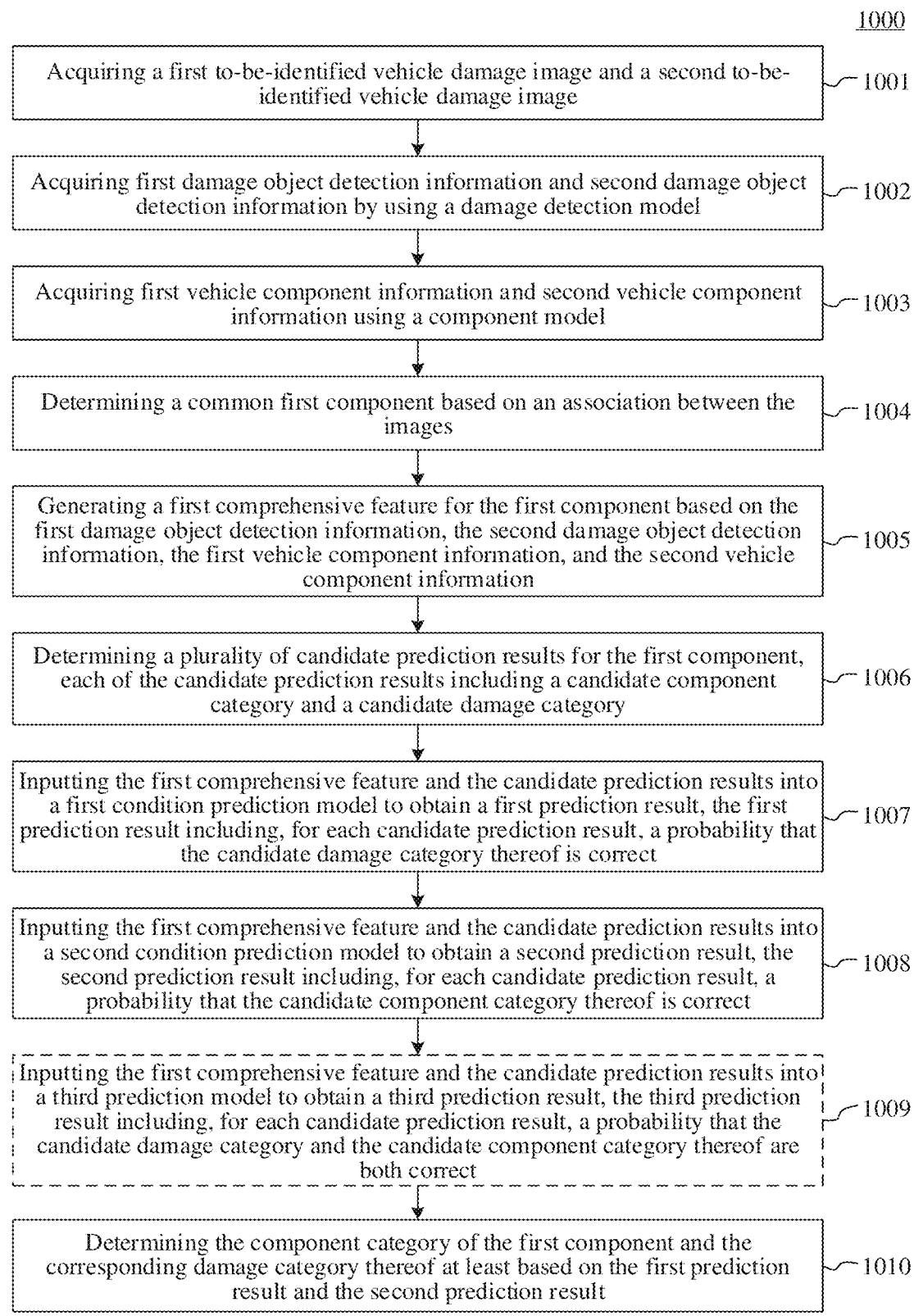
FIG. 10 shows a method for assessing vehicle damage according to an embodiment.

FIG. 10 shows a method 1000 for assessing vehicle damage according to an embodiment. The method 1000 is used for smart damage assessment based on at least two vehicle damage images. As shown in FIG. 10, the method 1000 at least includes the following steps.

First, in step 1001, a first to-be-identified vehicle damage image and a second to-be-identified vehicle damage image are acquired. As mentioned above, the first vehicle damage image and the second vehicle damage image belong to the same damage assessment case.

Next, in step 1002, first damage object detection information for the first vehicle damage image and second damage object detection information for the second vehicle damage image are acquired using a pre-trained damage detection model. The first damage object detection information includes information of a plurality of first damage detection frames framing a plurality of damage objects in the first vehicle damage image, and the second damage object detection information includes information of a plurality of second damage detection frames framing a plurality of damage objects in the second vehicle damage image.

This step corresponds to executing step 22 as shown in FIG. 2 for the first vehicle damage image and the second vehicle damage image respectively. The description of the specific process will not be repeated.

In addition, in step 1003, first vehicle component information for the first vehicle damage image and second vehicle component information for the second vehicle damage image are quired using a pre-trained component model. The first vehicle component information includes first component object detection information and first component segmentation information, and the second vehicle component information includes second component object detection information and second component segmentation information. Both the first component object detection information and the second component object detection information include a detected first component.

This step corresponds to executing step 23 as shown in FIG. 2 for the first vehicle damage image and the second vehicle damage image respectively, thereby obtaining the first vehicle component information and the second vehicle component information, respectively. The description of the specific process will not be repeated.

Next, in step 1004, a common first component is determined from the first component object detection information and the second component object detection information based on an association between the first vehicle damage image and the second vehicle damage image.

There are some image matching models capable of implementing matching and positioning of two images, i.e., determining the position of content shown in one image in another image, or determining similar, common content in two images. Therefore, a common component, hereinafter still referred to as the first component, can be determined from the first component object detection information and the second component object detection information using such a matching model based on an association between the first vehicle damage image and the second vehicle damage image.

Next, in step 1005, a first comprehensive feature for the first component is generated based on the first damage object detection information, the second damage object detection information, the first vehicle component information, and the second vehicle component information. The first comprehensive feature includes a fused component feature and a fused damage feature of the first component. The fused component feature is obtained by fusing a first component feature and a second component feature. The first component feature is generated based on the first vehicle damage image, and the second component feature is generated based on the second vehicle damage image. The fused damage feature is obtained by fusing a first damage feature and a second damage feature. The first damage feature is generated based on damage features of at least one first damage detection frame belonging to the first component in the first vehicle damage image, and the second damage feature is generated based on damage features of at least one second damage detection frame belonging to the first component in the second vehicle damage image.

In an embodiment, for the first component, step 24 of FIG. 2 can be executed respectively based on the first vehicle damage image and the second vehicle damage image, to obtain a comprehensive feature V1 based on the first vehicle damage image and a second comprehensive feature V2 based on the second vehicle damage image respectively. The comprehensive feature V1 includes a component feature of the first component (referred to as the first component feature) extracted based on the first vehicle damage image, and the fused damage feature (referred as the first damage feature) generated based on the damage feature of the damage detection frame belonging to the first component in the first vehicle damage image. The comprehensive feature V2 includes a component feature of the first component (referred to as the second component feature) extracted based on the second vehicle damage image, and the fused damage feature (referred as the second damage feature) generated based on the damage feature of the damage detection frame belonging to the first component in the second vehicle damage image. Then, the two comprehensive features V1 and V2 can be further fused to obtain a final first comprehensive feature.

For example, the first component feature and the second component feature are fused to obtain the fused component feature. The first damage feature and the second damage feature are fused to obtain the fused damage feature. The fused component feature and the fused damage feature together constitute the first comprehensive feature.

The features can be fused by a variety of fusion approaches, such as stitching, averaging, or maximum pooling, which are not enumerated here.

It can be seen that, in step 1005, for the common first component included in the two vehicle damage images, features extracted separately based on the two images are further fused to obtain the first comprehensive feature of the first component. The first comprehensive feature comprehensively reflects component features of the first component shown in the two images, and damage features of the component.

Next, in step 1006, a plurality of candidate prediction results are determined for the first component. Each of the candidate prediction results includes a candidate component category and a candidate damage category. The execution approach of this step is similar to that of the step 25, the description of which will not be repeated.

Next, in step 1007, the first comprehensive feature and the plurality of candidate prediction results are input into a pre-trained first condition prediction model to obtain a first prediction result. The first prediction result includes, for each of the candidate prediction results, a probability that the candidate damage category thereof is correct.

And, in step 1008, the first comprehensive feature and the plurality of candidate prediction results are input into a pre-trained second condition prediction model to obtain a second prediction result. The second prediction result includes, for each of the candidate prediction results, a probability that the candidate component category thereof is correct.

The description of step 26 and step 27 in FIG. 2 can be referred to for the training and use of the first condition prediction model and the second condition prediction model, the description of which will not be repeated.

Next, in step 1010, the component category of the first component and the corresponding damage category thereof are determined at least based on the first prediction result and the second prediction result.

This step can be executed by referring to the description of step 28.

As mentioned above, component-level damage features of a component in a plurality of images are obtained by integrating the first vehicle damage image and the second vehicle damage image, and the component category and the damage category of the component are determined using a prediction model based on the component-level damage features.

Further, in an embodiment, the method of FIG. 10 further includes step 1009 (shown in a dashed block), in which the first comprehensive feature and the plurality of candidate prediction results are input into a pre-trained third prediction model to obtain a third prediction result. The third prediction result includes, for each candidate prediction result, a probability that the candidate damage category and the candidate component category thereof are both correct.

The above description may be referred to for the training and use of the third prediction model, which will not be repeated.

In cases where the third prediction model is further used, accordingly, step 1010 includes determining the component category of the first component and the corresponding damage category thereof based on the first prediction result, the second prediction result, and the third prediction result.

In the above description for step 28, multiple embodiments for determining the component category and the damage category thereof based on the first prediction result, the second prediction result, and the third prediction result have been described. These embodiments can also be applied to the execution of step 1010.

In addition, in an embodiment, a decision tree model can be further established by using the first condition prediction model, the second condition prediction model, and the third prediction model as tree nodes, and the decision tree model is used to determine the component category of the first component and the corresponding damage category thereof. In such a case, the first condition prediction model, the second condition prediction model, and the third prediction model are all used as weak classifiers that output preliminary classification results. By training the decision tree model, the weights of the weak classifiers corresponding to the tree nodes are determined, thereby outputting a final result based on the preliminary classification results.

In an embodiment, the decision tree model can be trained using a damage assessment form of a damage assessment case as annotation data. It can be understood insurance companies have large amounts of case data. These data generally include a series of vehicle damage images for a given case and a manually assessed damage assessment form for these images. The damage assessment form may show which components of a vehicle have been damaged and what damage has been caused to the components. Accordingly, the damage assessment form can be used as the annotation data to obtain the decision tree model by training. A final vehicle damage situation for the case can be determined using the trained decision tree model, based on the prediction results of the prediction models.

As can be seen from referring back to the processes in FIG. 1 to FIG. 10, in the smart damage assessment process, after damage is identified using a damage detection model and a component is identified using a component model, a component feature and a damage feature are fused to obtain a component-level damage feature. Then, a component category and a damage category are determined using a plurality of prediction models, including at least 2 condition prediction models, based on the component-level damage feature, thereby determining the vehicle damage situation and achieving smart damage assessment.

It can be understood that, in the process of training for smart decision making, training data of various types may be employed, including: 1) a damage assessment form for an entire case (combining correct component and damage categories for the entire case); 2) a damage assessment form for a single image (combining correct component and damage categories for a single image); 3) damage annotation; and 4) component annotation, where training data priorities may be 1)>2)>3)>4). When there is ample high priority data, better results will be obtained by training using the high priority data, and when there is not enough high priority data or the cost of acquiring the high priority data is very high, training data of the next higher priority, in order, can be acquired for training, for better overall decision-making results. If the annotation information of 3) and 4) is not complete, the training target in this case is a conditional probability.

Figure 11:
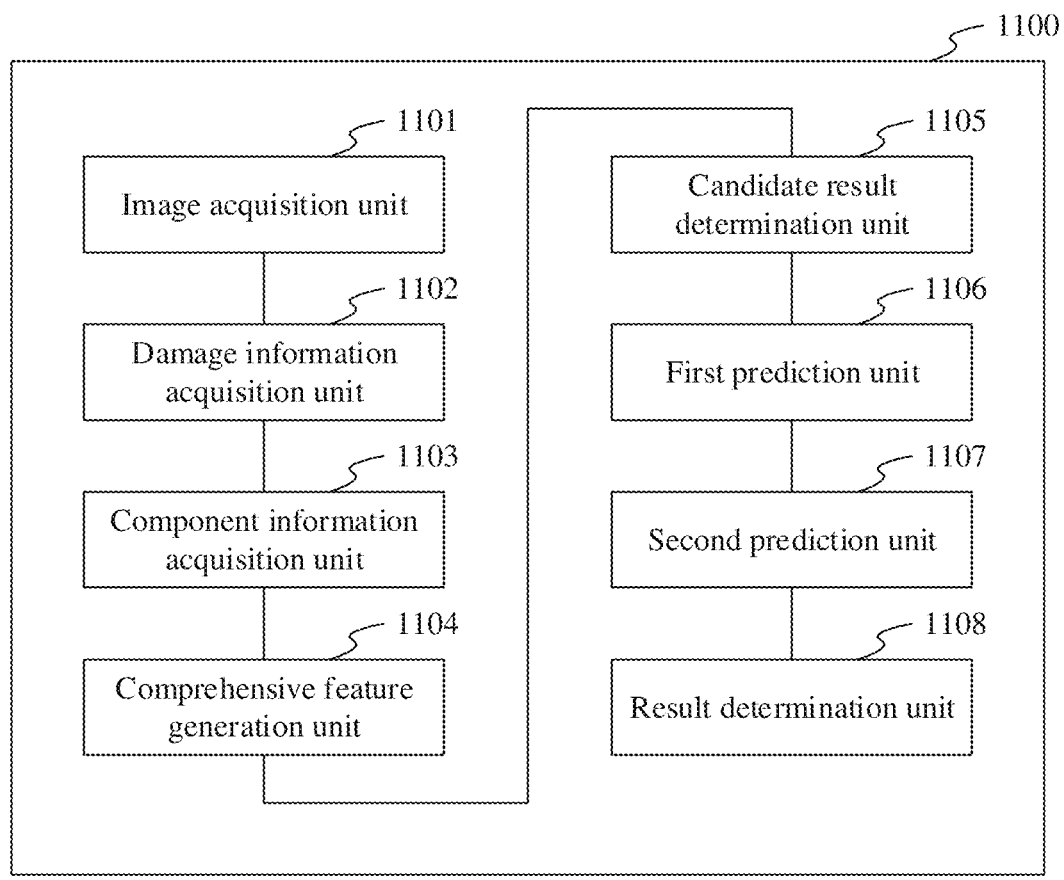
FIG. 11 shows a schematic block diagram of an apparatus for assessing vehicle damage according to an embodiment.

According to another embodiment, an apparatus for assessing vehicle damage is further provided. FIG. 11 shows a schematic block diagram of an apparatus for assessing vehicle damage according to an embodiment. It can be understood that the apparatus can be deployed in any device, platform, or cluster having computing and processing capabilities. As shown in FIG. 11, the apparatus 1100 for assessing vehicle damage includes:

an image acquisition unit 1101 configured to acquire a to-be-identified vehicle damage image;

a damage information acquisition unit 1102 configured to acquire damage object detection information using a pre-trained damage detection model, the damage object detection information including information of a plurality of damage detection frames framing a plurality of damage objects in the vehicle damage image;

a component information acquisition unit 1103 configured to acquire vehicle component information for the vehicle damage image using a pre-trained component model, the vehicle component information including component object detection information and component segmentation information, the component object detection information including a detected first component;

a comprehensive feature generation unit 1104 configured to generate a first comprehensive feature for the first component based on the damage object detection information and the vehicle component information, the first comprehensive feature including a component feature and a fused damage feature of the first component, and the fused damage feature being obtained by fusing damage features of at least one damage detection frame belonging to the first component among the plurality of damage detection frames;

a candidate result determination unit 1105 configured to determine a plurality of candidate prediction results for the first component, each of the candidate prediction results including a candidate component category and a candidate damage category;

a first prediction unit 1106 configured to input the first comprehensive feature and the plurality of candidate prediction results into a pre-trained first condition prediction model to obtain a first prediction result, the first prediction result including, for each one of candidate prediction results, a probability that the candidate damage category thereof is correct;

a second prediction unit 1107 configured to input the first comprehensive feature and the plurality of candidate prediction results into a pre-trained second condition prediction model to obtain a second prediction result, the second prediction result including, for each of the candidate prediction results, a probability that the candidate component category thereof is correct; and a result determination unit 1108 configured to determine the component category of the first component and the corresponding damage category thereof at least based on the first prediction result and the second prediction result.

In an embodiment, the damage information acquisition unit 1102 acquires damage detection information using a plurality of damage detection models. Accordingly, the damage detection information includes information of the plurality of damage detection frames from the plurality of damage detection models respectively.

According to an embodiment, the component information acquisition unit 1103 acquires vehicle component information for the vehicle damage image by:

acquiring the component object detection information for the vehicle damage image using a component detection model, the component object detection information including at least one component detection frame framing a corresponding component and a predicted component category corresponding to each component detection frame; and acquiring a segmentation result for all components in the vehicle damage image using a component segmentation model.

In an embodiment, the component model is implemented based on a convolutional neural network. Accordingly, the comprehensive feature generation unit 1104 may acquire a feature associated with the first component in the vehicle damage image from a convolutional layer of the convolutional neural network for use as the component feature of the first comprehensive feature.

In an embodiment, the comprehensive feature generation unit 1104 generates the fused damage feature by:

determining at least one damage detection frame belonging to the first component based on the damage object detection information and the component segmentation information;

acquiring the damage features of the at least one damage detection frame; and performing a fusion operation on the damage features of the at least one damage detection frame to obtain the fused damage feature.

Further, in an embodiment, the comprehensive feature generation unit 1104 determines at least one damage detection frame belonging to the first component by:

determining a first region covered by the first component based on the component segmentation information;

determining whether the plurality of damage detection frames fall within the first region based on position information of the plurality of damage detection frames; and determining damage detection frames falling within the first region as the at least one damage detection frame.

According to an embodiment, for a first damage detection frame included in the at least one damage detection frame, the comprehensive feature generation unit 1104 can acquire a corresponding first damage feature thereof by: extracting an image convolutional feature associated with the first damage detection frame from a convolutional layer of a convolutional neural network corresponding to the damage detection model.

Further, in an embodiment, the damage object detection information acquired by the damage information acquisition unit 1102 further includes a predicted damage category corresponding to each damage detection frame of the plurality of damage detection frames. In such a case, the comprehensive feature generation unit 1104 acquiring a first damage feature corresponding to the first damage detection frame further includes determining a first association feature based on an association relationship between the first damage detection frame and other damage detection frames of the plurality of damage detection frames, for use as a portion of the first damage feature. The association relationship at least includes one or more of the following items: an association relationship among damage detection frame positions, an association relationship among predicted damage categories, or an association relationship among frame contents reflected by the image convolutional feature.

According to an embodiment, the fusion operation performed by the comprehensive feature generation unit 1104 may include one or more of the following items: an operation to obtain a maximum, an operation to obtain a minimum, an operation to obtain an average, an operation to obtain a sum, or an operation to obtain a median.

In an embodiment, the component information acquired by the component information acquisition unit 1103 includes at least one component detection frame framing a corresponding component and a predicted component category corresponding to each component detection frame. On this basis, the candidate result determination unit 1105 can acquire a first predicted component category for the first component, and use the first predicted component category as the candidate component category.

In an embodiment, the damage object detection information acquired by the damage information acquisition unit 1102 includes the predicted damage category corresponding to each damage detection frame of the plurality of damage detection frames. On this basis, the candidate result determination unit 1105 can acquire at least one predicted damage category corresponding to the at least one damage detection frame. The candidate result determination unit 1105 may use the following item as the candidate damage category:

the damage category having the highest damage degree among the at least one predicted damage category; or the damage category accounting for the highest proportion among the at least one predicted damage category.

According to an implementation, the first condition prediction model used by the first prediction unit 1106 is trained based on at least one first training sample. The first training sample includes a first training image and first annotation data. The first annotation data at least include a first damage category tag for a first damaged component in the first training image. The first damage category tag is generated based on manually annotated damage annotation data.

Further, in an embodiment, the first damage category tag is generated by:

acquiring the manually annotated damage annotation data, the damage annotation data including a plurality of damage annotation frames annotated in the first training image and a damage category tag annotated for each of the damage annotation frames;

acquiring component contour information for the first training image;

determining at least one damage annotation frame corresponding to the first damaged component based on the component contour information; and using the damage category tag having the highest damage degree among the damage category tags of the at least one damage annotation frame as the first damage category tag.

Still further, the component contour information can be acquired based on manually annotated contour annotation data, or through a component segmentation model.

According to an implementation, the second condition prediction model used by the second prediction unit 1107 is trained based on at least one second training sample. The second training sample includes a second training image and second annotation data. The second annotation data at least include a second component category tag manually annotated for a second damaged component in the second training image.

In an embodiment, the result determination unit 1108 determines the component category of the first component and the corresponding damage category thereof by:

acquiring, for each candidate prediction result, a first probability from the first prediction result and corresponding to the candidate prediction result, and a second probability from the second prediction result and corresponding to the candidate prediction result;

determining a comprehensive correctness probability for each candidate prediction result based on the first probability and the second probability;

selecting at least one prediction result from the plurality of candidate prediction results based on the comprehensive correctness probability; and determining the component category of the first component and the corresponding damage category based on the candidate component categories and the candidate damage categories included in the at least one prediction result.

Further, the candidate result determination unit 1105 can determine a comprehensive correctness probability for each candidate prediction result by:

using the maximum of the first probability and the second probability as the comprehensive correctness probability; or using the sum of the first probability and the second probability as the comprehensive correctness probability; or using the product of the first probability and the second probability as the comprehensive correctness probability.

In an embodiment, the apparatus 1100 further includes a third prediction unit (not shown) configured to input the first comprehensive feature and the plurality of candidate prediction results into a pre-trained third prediction model to obtain a third prediction result. The third prediction result includes, for each candidate prediction result, a probability that the candidate damage category and the candidate component category thereof are both correct.

In an embodiment, the third prediction model is trained based on at least one third training sample. The third training sample includes a third training image and third annotation data. The third annotation data includes a third component category tag and a third damage category tag that are manually annotated for a third damaged component in the third training image.

Accordingly, in an embodiment, the result determination unit 1108 can determine the component category of the first component and the corresponding damage category thereof based on the first prediction result, the second prediction result, and the third prediction result.

In an embodiment, the result determination unit 1108 can determine the component category of the first component and the corresponding damage category thereof by:

acquiring, for each candidate prediction result, a first probability from the first prediction result and corresponding to the candidate prediction result, a second probability from the second prediction result and corresponding to the candidate prediction result, and a third probability from the third prediction result and corresponding to the candidate prediction result;

determining a comprehensive correctness probability for each candidate prediction result based on the first probability, the second probability, and the third probability;

selecting at least one prediction result from the plurality of candidate prediction results based on the comprehensive correctness probability; and determining the component category of the first component and the corresponding damage category based on the candidate component categories and the candidate damage categories included in the at least one prediction result.

In an embodiment, the apparatus may further include a replacement or repair scheme determination unit (not shown) configured to determine a replacement or repair scheme for the first component based on the component category of the first component and the corresponding damage category thereof.

Figure 12:
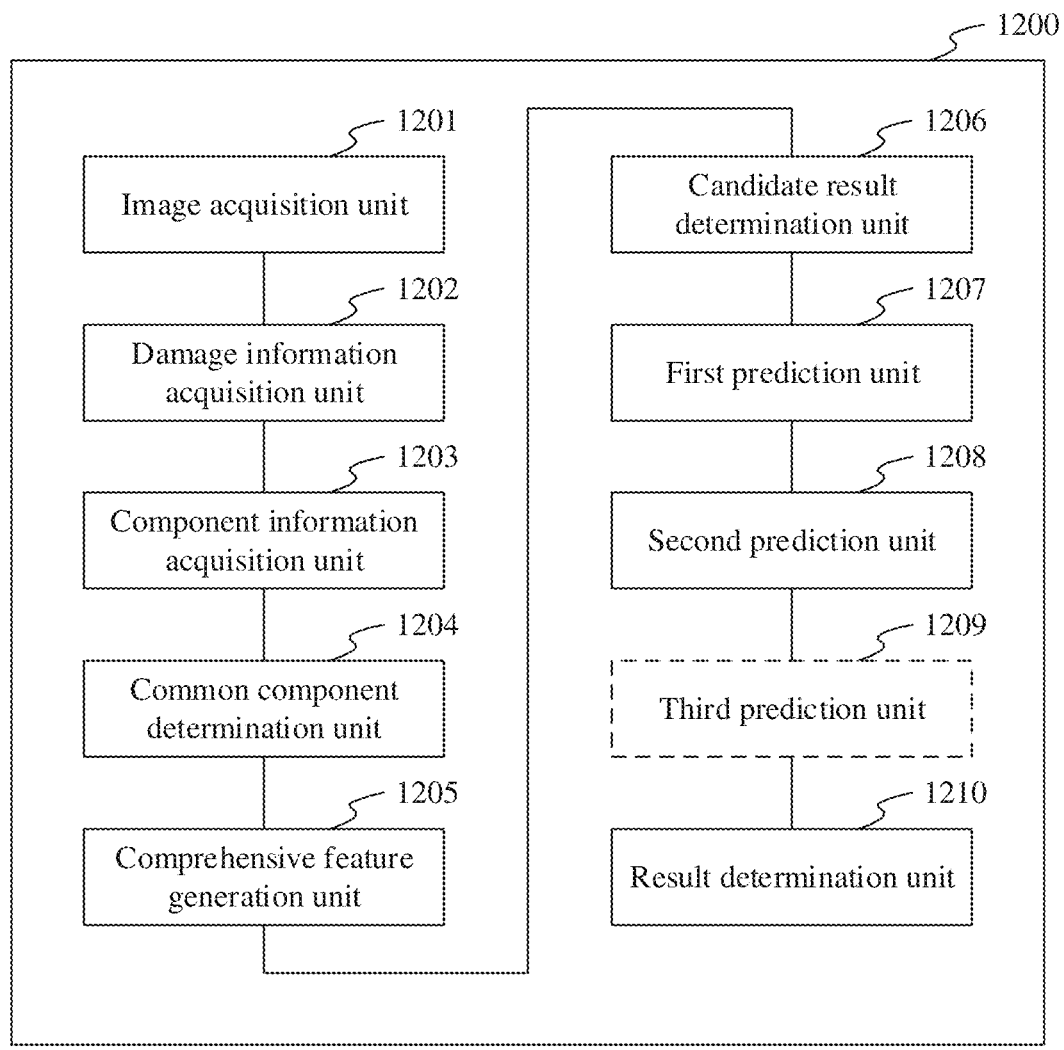
FIG. 12 shows a schematic block diagram of an apparatus for assessing vehicle damage according to an embodiment.

In another embodiment, an apparatus for assessing vehicle damage is further provided to assess damage based on a plurality of vehicle damage images. FIG. 12 shows a schematic block diagram of an apparatus for assessing vehicle damage according to an embodiment. It can be understood that the apparatus can be deployed in any device, platform, or cluster having computing and processing capabilities. As shown in FIG. 12, the apparatus 1200 for assessing vehicle damage includes:

an image acquisition unit 1201 configured to acquire a first to-be-identified vehicle damage image and a second to-be-identified vehicle damage image, the first vehicle damage image and the second vehicle damage image belonging to the same damage assessment case;

a damage information acquisition unit 1202 configured to acquire first damage object detection information for the first vehicle damage image and second damage object detection information for the second vehicle damage image using a pre-trained damage detection model, the first damage object detection information including information of a plurality of first damage detection frames framing a plurality of damage objects in the first vehicle damage image, and the second damage object detection information including information of a plurality of second damage detection frames framing a plurality of damage objects in the second vehicle damage image;

a component information acquisition unit 1203 configured to acquire first vehicle component information for the first vehicle damage image and second vehicle component information for the second vehicle damage image using a pre-trained component model, the first vehicle component information including first component object detection information and first component segmentation information, and the second vehicle component information including second component object detection information and second component segmentation information;

a common component determination unit 1204 configured to determine a common first component from the first component object detection information and the second component object detection information based on an association between the first vehicle damage image and the second vehicle damage image;

a comprehensive feature generation unit 1205 configured to generate a first comprehensive feature for the first component based on the first damage object detection information, the second damage object detection information, the first vehicle component information, and the second vehicle component information, the first comprehensive feature including a fused component feature and a fused damage feature of the first component, where the fused component feature is obtained by fusing a first component feature and a second component feature, the first component feature is generated based on the first vehicle damage image, and the second component feature is generated based on the second vehicle damage image; the fused damage feature is obtained by fusing a first damage feature and a second damage feature, the first damage feature is generated based on damage features of at least one first damage detection frame belonging to the first component in the first vehicle damage image, and the second damage feature is generated based on damage features of at least one second damage detection frame belonging to the first component in the second vehicle damage image;

a candidate result determination unit 1206 configured to determine a plurality of candidate prediction results for the first component, each of the candidate prediction results including a candidate component category and a candidate damage category;

a first prediction unit 1207 configured to input the first comprehensive feature and the plurality of candidate prediction results into a pre-trained first condition prediction model to obtain a first prediction result, the first prediction result including, for each of the candidate prediction results, a probability that the candidate damage category thereof is correct;

a second prediction unit 1208 configured to input the first comprehensive feature and the plurality of candidate prediction results into a pre-trained second condition prediction model to obtain a second prediction result, the second prediction result including, for each of the candidate prediction results, a probability that the candidate component category thereof is correct; and a result determination unit 1210 configured to determine the component category of the first component and the corresponding damage category thereof at least based on the first prediction result and the second prediction result.

In an embodiment, the apparatus 1200 further includes a third prediction unit 1209 (shown by a dashed line) configured to input the first comprehensive feature and the plurality of candidate prediction results into a pre-trained third prediction model to obtain a third prediction result, where the third prediction result includes, for each candidate prediction result, a probability that the candidate damage category and the candidate component category thereof are both correct.

Accordingly, the result determination unit 1210 can be configured to determine the component category of the first component and the corresponding damage category thereof based on the first prediction result, the second prediction result, and the third prediction result.

A component category and an overall damage category of a vehicle are predicted and determined by the apparatus based on a to-be-identified vehicle damage image, to implement smart damage assessment.

According to another embodiment, a computer-readable storage medium is further provided, storing a computer program thereon, where the computer program, when executed in a computer, causes the computer to execute the method described in FIG. 2 and FIG. 10.

Figure 13:
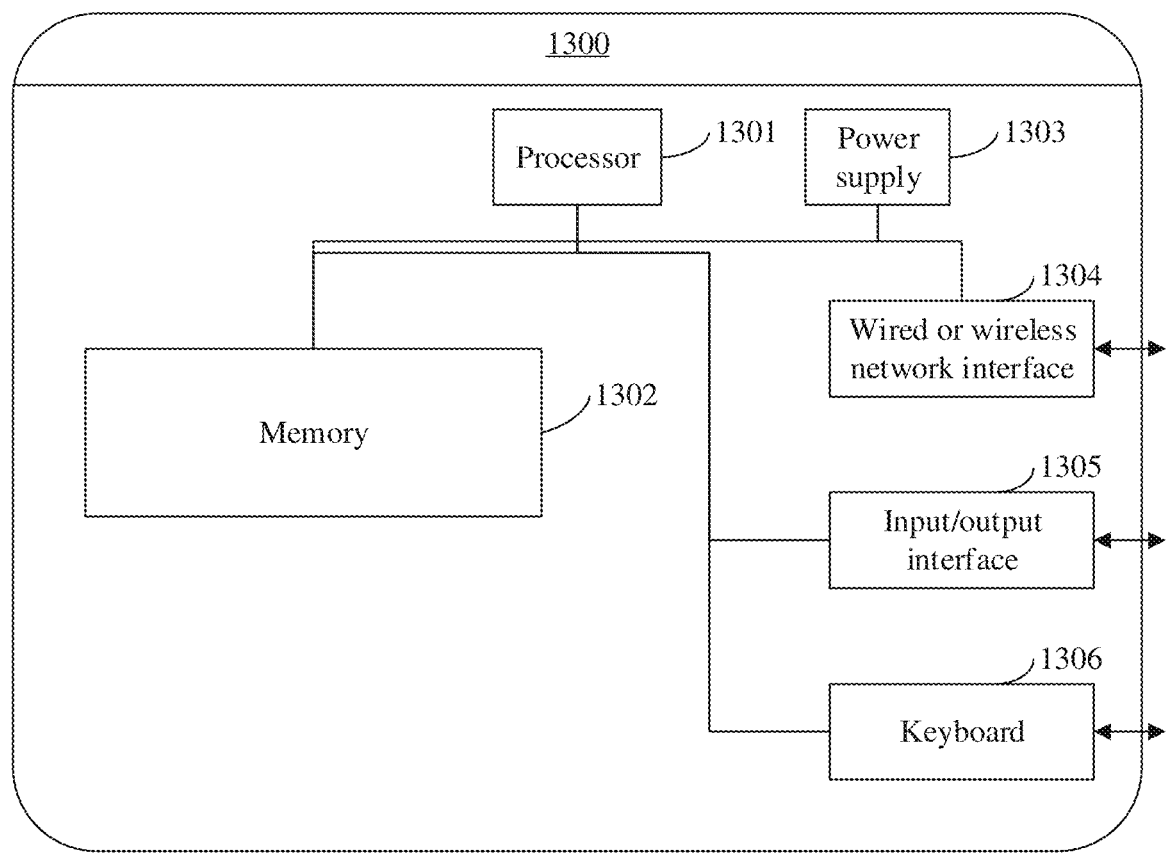
FIG. 13 is a schematic diagram of an apparatus for assessing vehicle damage according to an embodiment.

According to still another embodiment, an apparatus for assessing vehicle damage is further provided, including a memory and a processor, where the memory stores executable codes, and the processor, when executing the executable codes, implements the method described in FIG. 2 and FIG. 10. FIG. 13 is a schematic diagram of an apparatus 1300 for assessing vehicle damage according to an embodiment.

The apparatus 1300 may vary greatly depending on different configurations or performance and may include one or more processors 1301 and a memory 1302.

The one or more processors 1301 may include one or more dedicated processing units, application-specific integrated circuits (ASICs), field-programmable gate arrays (FPGAs), or various other types of processors or processing units. The one or more processors 1301 are coupled with the memory 1302 and configured to execute instructions stored in the memory 1302 to perform the above described methods.

The memory 1302 may include a permanent memory, a non-permanent memory, a random access memory (RAM) and/or a non-volatile memory (such as a read-only memory (ROM) or a flash memory (flash RAM)), etc.

As will be appreciated by those skilled in the art, in one or more of the above embodiments, the functions described in the present disclosure may be implemented using hardware, software, firmware, or any combination thereof. When the functions are implemented by software, the functions may be stored in a computer-readable medium or transmitted as one or more instructions or codes on a computer-readable medium.

Although the specification has been described in conjunction with specific embodiments, many alternatives, modifications and variations will be apparent to those skilled in the art. Accordingly, the following claims embrace all such alternatives, modifications and variations that fall within the terms of the claims.

The invention claimed is:

1. A computer-executed method for assessing vehicle damage, comprising:
   generating a first comprehensive feature for a first component of a vehicle based on damage object detection information and vehicle component information acquired from a vehicle damage image, the first comprehensive feature comprising a component feature and a fused damage feature of the first component, the fused damage feature being obtained by fusing damage features of at least one damage detection frame belonging to the first component among a plurality of damage detection frames;
   determining a plurality of candidate prediction results for the first component, each of the candidate prediction results comprising a candidate component category and a candidate damage category;
   inputting the first comprehensive feature and the plurality of candidate prediction results into a pre-trained first condition prediction model to obtain a first prediction result, the first prediction result comprising, for each of the candidate prediction results, a probability that the candidate damage category thereof is correct;
   inputting the first comprehensive feature and the plurality of candidate prediction results into a pre-trained second condition prediction model to obtain a second prediction result, the second prediction result comprising, for each of the candidate prediction results, a probability that the candidate component category thereof is correct; and
   determining a component category of the first component and a corresponding damage category thereof at least based on the first prediction result and the second prediction result.

2. The method according to claim 1, wherein generating the first comprehensive feature for the first component of the vehicle based on the damage object detection information and the vehicle component information comprises:
   determining the at least one damage detection frame belonging to the first component based on the damage object detection information and the component segmentation information;
   acquiring the damage features of the at least one damage detection frame; and
   performing a fusion operation on the damage features of the at least one damage detection frame to obtain the fused damage feature.

3. The method according to claim 2, wherein determining the at least one damage detection frame belonging to the first component comprises:
   determining a first region covered by the first component based on component segmentation information included in the vehicle component information;
   determining whether the plurality of damage detection frames fall within the first region based on position information of the plurality of damage detection frames; and
   determining a damage detection frame falling within the first region as the at least one damage detection frame.

4. The method according to claim 2, wherein the at least one damage detection frame comprises a first damage detection frame; and
   acquiring the damage features of the at least one damage detection frame comprises acquiring a first damage feature corresponding to the first damage detection frame, by extracting an image convolutional feature associated with the first damage detection frame from a convolutional layer of a convolutional neural network corresponding to a damage detection model.

5. The method according to claim 4, wherein the damage object detection information comprises a predicted damage category corresponding to each damage detection frame of the plurality of damage detection frames; and
   acquiring the first damage feature corresponding to the first damage detection frame further comprises:
   determining a first association feature based on an association relationship between the first damage detection frame and other damage detection frames of the plurality of damage detection frames for use as a portion of the first damage feature, the association relationship at least comprising one or more of: an association relationship among damage detection frame positions, an association relationship among predicted damage categories, or an association relationship among frame contents reflected by the image convolutional feature.

6. The method according to claim 2, wherein the fusion operation comprises one or more of: an operation to obtain a maximum, an operation to obtain a minimum, an operation to obtain an average, an operation to obtain a sum, or an operation to obtain a median.

7. The method according to claim 1, wherein the damage object detection information comprises a predicted damage category corresponding to each damage detection frame of the plurality of damage detection frames; and
   determining a plurality of candidate prediction results for the first component comprises:
   acquiring at least one predicted damage category corresponding to at least one damage detection frame; and
   using, as the candidate damage category, one of:
   the damage category having the highest damage degree among the at least one predicted damage category; or
   the damage category accounting for the highest proportion among the at least one predicted damage category.

8. The method according to claim 1, wherein the first condition prediction model is trained based on at least one first training sample, the first training sample comprising a first training image and first annotation data, the first annotation data at least comprising a first damage category tag for a first damaged component in the first training image, wherein the first damage category tag is generated based on manually annotated damage annotation data.

9. The method according to claim 8, wherein the first damage category tag is generated by:
   acquiring the manually annotated damage annotation data, the manually annotated damage annotation data comprising a plurality of damage annotation frames annotated in the first training image and a damage category tag annotated for each of the damage annotation frames;
   acquiring component contour information for the first training image;
   determining at least one damage annotation frame corresponding to the first damaged component based on the component contour information; and using the damage category tag having the highest damage degree among the damage category tags corresponding to the at least one damage annotation frame as the first damage category tag.

10. The method according to claim 9, wherein acquiring component contour information for the first training image comprises:
   acquiring the component contour information based on manually annotated contour annotation data; or
   acquiring the component contour information through a component segmentation model.

11. The method according to claim 1, wherein the second condition prediction model is trained based on at least one second training sample, the second training sample comprising a second training image and second annotation data, and the second annotation data at least comprising a second component category tag manually annotated for a second damaged component in the second training image.

12. The method according to claim 1, wherein determining the component category of the first component and the corresponding damage category thereof at least based on the first prediction result and the second prediction result comprises:
   acquiring, for each candidate prediction result, a first probability from the first prediction result and corresponding to the candidate prediction result, and a second probability from the second prediction result and corresponding to the candidate prediction result;
   determining a comprehensive correctness probability for each candidate prediction result based on the first probability and the second probability;
   selecting at least one prediction result from the plurality of candidate prediction results based on the comprehensive correctness probability; and
   determining the component category of the first component and the corresponding damage category thereof based on the candidate component category and the candidate damage category included in the at least one prediction result.

13. The method according to claim 12, wherein determining a comprehensive correctness probability for each candidate prediction result comprises at least one of:
   using the maximum of the first probability and the second probability as the comprehensive correctness probability; or
   using the sum of the first probability and the second probability as the comprehensive correctness probability; or
   using the product of the first probability and the second probability as the comprehensive correctness probability.

14. The method according to claim 1, further comprising:
   inputting the first comprehensive feature and the plurality of candidate prediction results into a pre-trained third prediction model to obtain a third prediction result, the third prediction result comprising, for each of the candidate prediction results, a probability that the candidate damage category and the candidate component category thereof are both correct.

15. The method according to claim 14, wherein the third prediction model is trained based on at least one third training sample, the third training sample comprising a third training image and third annotation data, and the third annotation data comprising a third component category tag and a third damage category tag that are manually annotated for a third damaged component in the third training image.

16. The method according to claim 14, wherein determining the component category of the first component and the corresponding damage category thereof at least based on the first prediction result and the second prediction result comprises:
   determining the component category of the first component and the corresponding damage category thereof based on the first prediction result, the second prediction result, and the third prediction result.

17. The method according to claim 16, wherein determining the component category of the first component and the corresponding damage category thereof based on the first prediction result, the second prediction result, and the third prediction result comprises:
   acquiring, for each candidate prediction result, a first probability from the first prediction result and corresponding to the candidate prediction result, a second probability from the second prediction result and corresponding to the candidate prediction result, and a third probability from the third prediction result and corresponding to the candidate prediction result;
   determining a comprehensive correctness probability for each candidate prediction result based on the first probability, the second probability, and the third probability;
   selecting at least one prediction result from the plurality of candidate prediction results based on the comprehensive correctness probability; and
   determining the component category of the first component and the corresponding damage category based on the candidate component category and the candidate damage category included in the at least one prediction result.

18. The method according to claim 1, further comprising:
   determining a replacement or repair scheme for the first component based on the component category of the first component and the corresponding damage category thereof.

19. An apparatus for assessing vehicle damage, comprising:
   a memory storing computer-executable instructions; and
   a processor configured to, when executing the computer-executable instructions, perform:
   generating a first comprehensive feature for a first component of a vehicle based on damage object detection information and vehicle component information acquired from a vehicle damage image, the first comprehensive feature comprising a component feature and a fused damage feature of the first component, the fused damage feature being obtained by fusing damage features of at least one damage detection frame belonging to the first component among a plurality of damage detection frames;
   determining a plurality of candidate prediction results for the first component, each of the candidate prediction results comprising a candidate component category and a candidate damage category;
   inputting the first comprehensive feature and the plurality of candidate prediction results into a pre-trained first condition prediction model to obtain a first prediction result, the first prediction result comprising, for each of the candidate prediction results, a probability that the candidate damage category thereof is correct;
   inputting the first comprehensive feature and the plurality of candidate prediction results into a pre-trained second condition prediction model to obtain a second prediction result, the second prediction result comprising, for each of the candidate prediction results, a probability that the candidate component category thereof is correct; and determining a component category of the first component and a corresponding damage category thereof at least based on the first prediction result and the second prediction result.

20. A non-transitory computer-readable storage medium having stored thereon instructions that, when executed by a processor of a device, cause the device to perform a method for assessing vehicle damage, the method comprising:

generating a first comprehensive feature for a first component of a vehicle based on damage object detection information and vehicle component information acquired from a vehicle damage image, the first comprehensive feature comprising a component feature and a fused damage feature of the first component, the fused damage feature being obtained by fusing damage features of at least one damage detection frame belonging to the first component among a plurality of damage detection frames;

determining a plurality of candidate prediction results for the first component, each of the candidate prediction results comprising a candidate component category and a candidate damage category;

inputting the first comprehensive feature and the plurality of candidate prediction results into a pre-trained first condition prediction model to obtain a first prediction result, the first prediction result comprising, for each of the candidate prediction results, a probability that the candidate damage category thereof is correct;

inputting the first comprehensive feature and the plurality of candidate prediction results into a pre-trained second condition prediction model to obtain a second prediction result, the second prediction result comprising, for each of the candidate prediction results, a probability that the candidate component category thereof is correct; and determining a component category of the first component and a corresponding damage category thereof at least based on the first prediction result and the second prediction result.

* * * * *

UNITED STATES PATENT AND TRADEMARK OFFICE
CERTIFICATE OF CORRECTION

| | |
|---|---|
| PATENT NO. | : 10,885,397 B2 |
| APPLICATION NO. | : 16/871446 |
| DATED | : January 5, 2021 |
| INVENTOR(S) | : Xu |

Page 1 of 1

It is certified that error appears in the above-identified patent and that said Letters Patent is hereby corrected as shown below:

On the Title Page

Item (30), under "Foreign Application Priority Data,":
"Dec 29, 2018 (CN) ............ 2018 1 1631844"
Should read:
--Dec 29, 2018 (CN) ............ 2018 1 1631844.0--.

Signed and Sealed this
First Day of March, 2022

Drew Hirshfeld
*Performing the Functions and Duties of the*
*Under Secretary of Commerce for Intellectual Property and*
*Director of the United States Patent and Trademark Office*